US007739981B2

(12) United States Patent
Miura

(10) Patent No.: US 7,739,981 B2
(45) Date of Patent: Jun. 22, 2010

(54) LIQUID DROPLET EJECTION APPARATUS, METHOD FOR FORMING PATTERN, AND METHOD FOR MANUFACTURING ELECTRO-OPTIC DEVICE

(75) Inventor: Hirotsuna Miura, Fujimi (JP)

(73) Assignee: Seiko Epson Corporation (JP)

( * ) Notice: Subject to any disclaimer, the term of this patent is extended or adjusted under 35 U.S.C. 154(b) by 786 days.

(21) Appl. No.: 11/433,913

(22) Filed: May 12, 2006

(65) Prior Publication Data

US 2006/0262175 A1 Nov. 23, 2006

(30) Foreign Application Priority Data

May 13, 2005 (JP) ............................. 2005-140741

(51) Int. Cl.

| | |
|---|---|
| ***B05B 5/00*** | (2006.01) |
| ***B05B 5/025*** | (2006.01) |
| ***B41J 2/04*** | (2006.01) |
| ***B41J 2/01*** | (2006.01) |
| ***B41J 2/435*** | (2006.01) |
| ***G01D 15/14*** | (2006.01) |
| ***H01J 29/70*** | (2006.01) |
| ***H01J 33/00*** | (2006.01) |

(52) U.S. Cl. ......................... 118/642; 118/630; 347/54; 347/102; 347/229

(58) Field of Classification Search ................. 118/642, 118/630; 347/54, 102, 229
See application file for complete search history.

(56) References Cited

U.S. PATENT DOCUMENTS 6,849,308 B1 * 2/2005 Speakman et al. .......... 427/595
2004/0226929 A1 * 11/2004 Miura et al. ........... 219/121.85

FOREIGN PATENT DOCUMENTS

| | | |
|---|---|---|
| JP | 08-160219 | 6/1996 |
| JP | 08-220335 | 8/1996 |
| JP | 2004-181448 | 2/2004 |
| JP | 2004-130309 | 4/2004 |
| JP | 2004-255335 | 9/2004 |
| JP | 2004-347694 | 12/2004 |
| JP | 2005-095849 | 4/2005 |
| JP | 2005-134465 | 5/2005 |

OTHER PUBLICATIONS

English translation of JP 2004-130309, Kiyohisa, Apr. 2004.*
Translation of International Preliminary Report on Patentability for the corresponding PCT application, PCT/JP2006/309554.

* cited by examiner

*Primary Examiner*—Ram N Kackar
*Assistant Examiner*—Keath T Chen
(74) *Attorney, Agent, or Firm*—Harness, Dickey & Pierce, P.L.C.

(57) ABSTRACT

A liquid droplet ejection apparatus has a droplet ejecting portion and an energy beam radiating portion. The liquid droplet ejecting portion ejects droplets containing pattern forming material onto an ejection target surface. The energy beam radiating portion radiates an energy beam onto a boundary between the droplets that have been received by the ejection target surface at different timings so as to move boundary areas of the droplets. Accordingly, using the liquid droplet ejection apparatus, a pattern having an accurately defined shape can be formed.

7 Claims, 12 Drawing Sheets

LIQUID DROPLET EJECTION APPARATUS, METHOD FOR FORMING PATTERN, AND METHOD FOR MANUFACTURING ELECTRO-OPTIC DEVICE

CROSS-REFERENCE TO RELATED APPLICATIONS

This application is based upon and claims the benefit of priority from prior Japanese Patent Application No. 2005-140741, filed on May 13, 2005, the entire contents of which are incorporated herein by reference.

BACKGROUND OF THE INVENTION

The present invention relates to a liquid droplet ejection apparatus, a method for forming a pattern, and a method for manufacturing an electro-optic device.

A procedure for manufacturing a color filter or an alignment film, which are employed in a liquid crystal display, involves a liquid phase process. In the liquid phase process, liquid containing material for forming thin films is ejected onto a film forming surface, or an ejection target surface. The liquid is then dried on the film forming surface so as to provide the thin films.

Specifically, an inkjet method is employed in the liquid phase process. In the inkjet method, the liquid is ejected onto the film forming surface as droplets and the droplets are dried to form the thin films. The inkjet method reduces the consumption amount of the liquid, compared to other types of liquid phase processes (such as a spin coating method or a dispenser method). Further, the inkjet method adjusts the positions at which the thin films are formed more accurately than the other methods.

Using the inkjet method, a thin film may be formed over a relatively wide range on a film forming surface as in a large-sized liquid crystal substrate. In this case, the substrate is repeatedly scanned with respect to a liquid droplet ejection head, which ejects liquid droplets in multiple cycles. The droplets from one of the cycles dry earlier than those from a following cycle. This creates a boundary (surface unevenness) between the droplets from different cycles, thus lowering the quality of an image displayed by the liquid crystal display.

In order to avoid formation of such boundaries (surface unevenness) between droplets that have been ejected at different timings, various solutions addressed to the inkjet method have been proposed. For example, as described in Japanese Laid-Open Patent Publication No. 2004-347694, a plurality of liquid droplet ejection heads are aligned in a direction (a sub scanning direction) perpendicular to a scanning direction of a substrate. Ejection nozzles, which eject liquid droplets, are spaced at uniform pitches with respect to the sub scanning direction. Thus, in a single cycle of scanning, which is performed in the scanning direction, the liquid droplets are continuously ejected onto an entire ejection target surface, thus avoiding the formation of the boundaries between the droplets.

However, as shown in FIG. 17A, in order to adjust the pitch of the ejection nozzles N to a value equal to a constant nozzle pitch Pn with respect to the sub scanning direction (direction X), the nozzles N of the liquid droplet ejection head FH1 are arranged offset from the nozzles N of the adjacent liquid droplet ejection head FH2 in the main scanning direction (direction Y) by a distance corresponding to the width (the head width Wh) of each liquid droplet ejection head FH1, FH2 in direction Y. Therefore, microdroplets ejected from the liquid droplet ejection head FH1 and microdroplets ejected from the liquid droplet ejection head FH2 are received by the substrate at different timings corresponding to the head width Wh.

Specifically, if a droplet 103 and a droplet 104, which have been received by the substrate at different timings, flow to overlap each other, a projected portion FDT is formed at a boundary between the droplet 103 and the droplet 104 on a film forming surface 102 of the substrate 101, with reference to FIG. 17B. The thickness of the projected portion FDT is several hundreds of nanometers to several micrometers. If the droplet 103 does not overlap the droplet 104, an area having smaller droplet thickness or an empty area may be caused at the boundary between the droplet 103 and the droplet 104.

This varies the thickness of the droplets or the thickness of the thin films at the boundaries between the droplets that have been ejected at different timings, thus lowering the quality of an image displayed by the liquid crystal display.

SUMMARY OF THE INVENTION

Accordingly, it is an objective of the present invention to provide a liquid droplet ejection apparatus and a method for forming a pattern by which the pattern is formed in an accurate shape, and a method for manufacturing an electro-optic device having an accurately shaped alignment film.

An aspect of the present invention provides a liquid droplet ejection apparatus that is configured in the following manner. The liquid droplet ejection apparatus includes a liquid droplet ejecting portion and an energy beam radiating portion. The liquid droplet ejecting portion ejects droplets of liquid containing pattern forming material onto an ejection target surface. The energy beam radiating portion radiates an energy beam onto a boundary between the droplets that have been received by the ejection target surface at different timings, thus moving the liquid contained in boundary areas of the droplets. Using the liquid droplet ejection apparatus, the liquid in the boundary areas of the droplets are caused to flow by the energy beam. This suppresses formation of projected portions in the boundary areas of the droplets and recessed portions between the droplets. That is, the shapes of the droplets that have been received by the ejection target surface can be adjusted in a desired manner (for example, the boundary areas of the droplets are evened or recessed or projected). This improves shaping accuracy of the droplets received by the ejection target surface. Accordingly, shaping accuracy of the pattern defined by the droplets is enhanced. In other words, the pattern having the accurately adjusted shape can be provided.

In the boundary between the droplets that have been received by the ejection target surface at the different timings, the boundary areas of the droplets may overlap each other to form an overlapping area. Radiation of the energy beam onto the boundary between the droplets may be performed to move the liquid contained in the overlapping area toward a non-overlapping area, or non-boundary areas of the droplets. This prevents formation of projected portions in the overlapping area, thus evening the surfaces of the ejected droplets. Accordingly, shaping accuracy of the droplets and that of the pattern are enhanced.

The energy beam radiating portion may include a scanning mechanism that scans the energy beam from the overlapping area toward the non-overlapping area and relatively to the droplets on the ejection target surface. In this case, through scanning of the energy beam by the scanning mechanism, the liquid contained in the overlapping area is effectively moved toward the non-overlapping area. This further accurately adjusts the shapes of the surfaces of the ejected droplets in a desired manner.

The energy beam radiated by the energy beam radiating portion may have an intensity in correspondence with the thickness of the overlapping area. In this case, for example, the liquid effectively flows from an area having greater thickness to an area having smaller thickness. This further evens the surfaces of the droplets.

The energy beam radiated by the energy beam radiating portion may have a direction element extending from the overlapping area toward the non-overlapping area. In this case, the energy of the energy beam is further efficiently converted into translational movement energy that acts to move the droplets.

The energy beam radiating portion may include a scanning mechanism that scans the energy beam in a direction in which the overlapping area extends and relatively to the droplets on the ejection target surface. This further reliably prevents formation of projected portions in the overlapping area. The shapes of the ejected droplets are thus further accurately adjusted in a desired manner.

The liquid droplet ejecting portion may include a plurality of liquid droplet ejection heads. The overlapping area may be formed by overlapping the boundary areas of droplets that have been ejected by different liquid droplet ejection heads with each other in the boundary between the droplets. In this case, using the liquid droplet ejection apparatus having the multiple liquid droplet ejection heads, the shaping accuracy of the pattern over a relatively wide range is improved.

The energy beam radiated by the energy beam radiating portion may be light. This makes it easy to select the energy beam in accordance with the wavelength range and the radiation intensity corresponding to the material (for example, solvent or dispersion medium) forming the droplets. Accordingly, the energy beam can be selected from a wider range and the present invention becomes applicable to a wider range of droplets.

The energy beam radiated by the energy beam radiating portion may be coherent light. In this case, a beam having a shape or intensity distribution that is further accurately adjusted in a desired manner can be provided. This improves shaping accuracy of the droplets and that of the pattern.

The energy beam radiating portion may include a cover through which the energy beam transmits. The cover covers the droplets on the ejection target surface. This suppresses drying of the droplets caused by the radiation of the energy beam, thus maintaining flowability of the droplets.

Another aspect of the present invention provides a method for forming a pattern as follows. The method for forming the pattern includes ejecting droplets of liquid containing pattern forming material onto an ejection target surface, forming a prescribed pattern on the ejection target surface by drying the droplets that have been received by the ejection target surface, and radiating an energy beam onto a boundary between the droplets that have been received by the ejection target surface at different timings before or when drying the droplets on the ejection target surface, thus moving the liquid contained in boundary areas of the droplets. In accordance with the method for forming the pattern, the liquid contained in the boundary areas of the droplets are caused to flow by the energy beam. This suppresses formation of projected portions in the boundary areas of the droplets and recessed portions between the droplets. That is, the shapes of the droplets that have been received by the ejection target surface can be adjusted in a desired manner (for example, the boundary areas of the droplets are evened or recessed or projected). This improves shaping accuracy of the droplets that have been ejected onto the ejection target surface. Accordingly, shaping accuracy of the pattern defined by the droplets is enhanced. In other words, the pattern having the accurately adjusted shape can be provided.

In the boundary between the droplets that have been received by the ejection target surface at the different timings, the boundary areas of the droplets may overlap each other and thus form an overlapping area. Radiation of the energy beam onto the boundary between the droplets is performed to move the liquid contained in the overlapping area toward a non-overlapping area, or non-boundary areas of the droplets. This prevents formation of projected portions in the overlapping area, thus evening the surfaces of the ejected droplets. Accordingly, shaping accuracy of the droplets and that of the pattern are enhanced.

The radiation of the energy beam may be performed before drying the droplets that have been received by the ejection target surface. This further reliably maintains the flowability of the droplets and further improves the shaping accuracy of the droplets compared to a case in which the energy beam is radiated when drying the droplets.

The radiation of the energy beam may be carried out while scanning the energy beam from the overlapping area toward the non-overlapping area. In this case, the liquid contained in the overlapping area further effectively flows toward the non-overlapping area. This further evens the surfaces of the droplets.

The energy beam radiated onto the boundary between the droplets may have an intensity in correspondence with the thickness of the overlapping area. In this case, for example, the liquid flows effectively from an area having greater thickness to an area having smaller thickness. This further evens the surfaces of the droplets.

The energy beam radiated onto the boundary between the droplets may have a direction element extending from the overlapping area toward the non-overlapping area. In this case, the energy of the energy beam is further efficiently converted into translational movement energy that acts to move the droplets.

The radiation of the energy beam may be performed while scanning the energy beam in a direction in which the overlapping area extends. This further reliably suppresses formation of projected portions in the overlapping area, thus further reliably evening the surfaces of the ejected droplets.

Another aspect of the present invention provides a method for manufacturing an electro-optic device as follows. The method includes forming an alignment film on a substrate in accordance with the above-described method for forming the pattern. The method for manufacturing the electro-optic device provides an electro-optic device including an alignment film having an accurately adjusted shape.

DETAILED DESCRIPTION OF THE PREFERRED EMBODIMENTS

A first embodiment of the present invention will now be described with reference to FIGS. 1 to 12.

Figure 1:
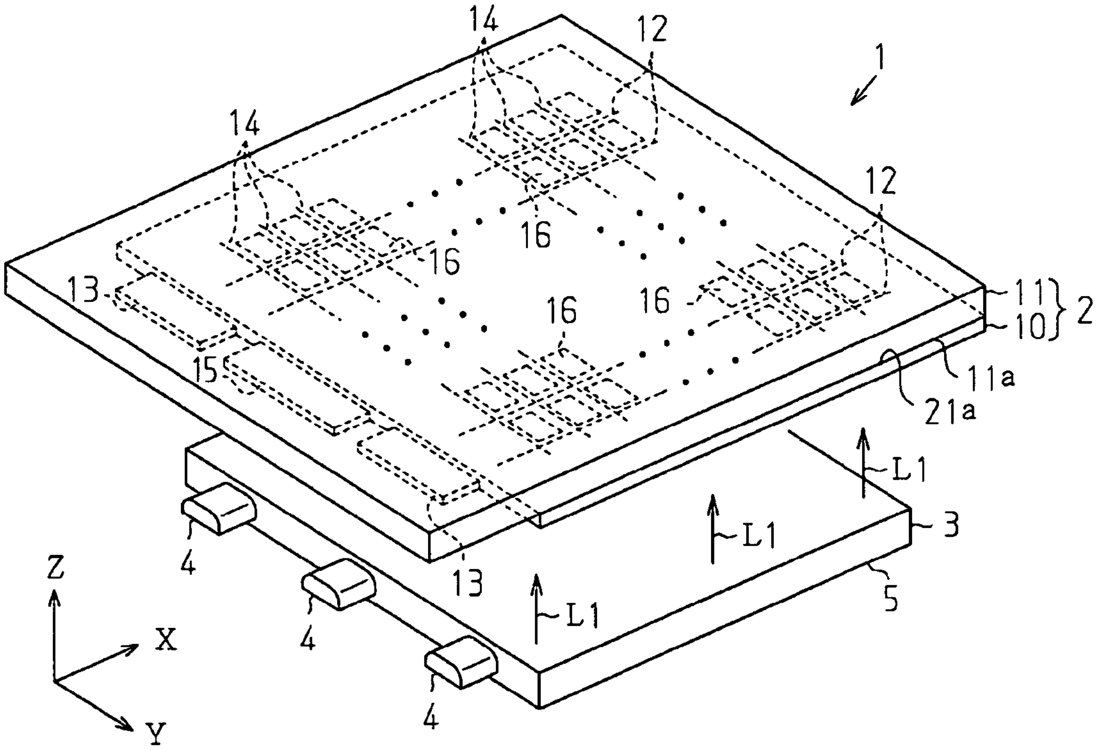
FIG. 1 is a perspective view showing a liquid crystal display according to a first embodiment of the present invention.
Figure 2:
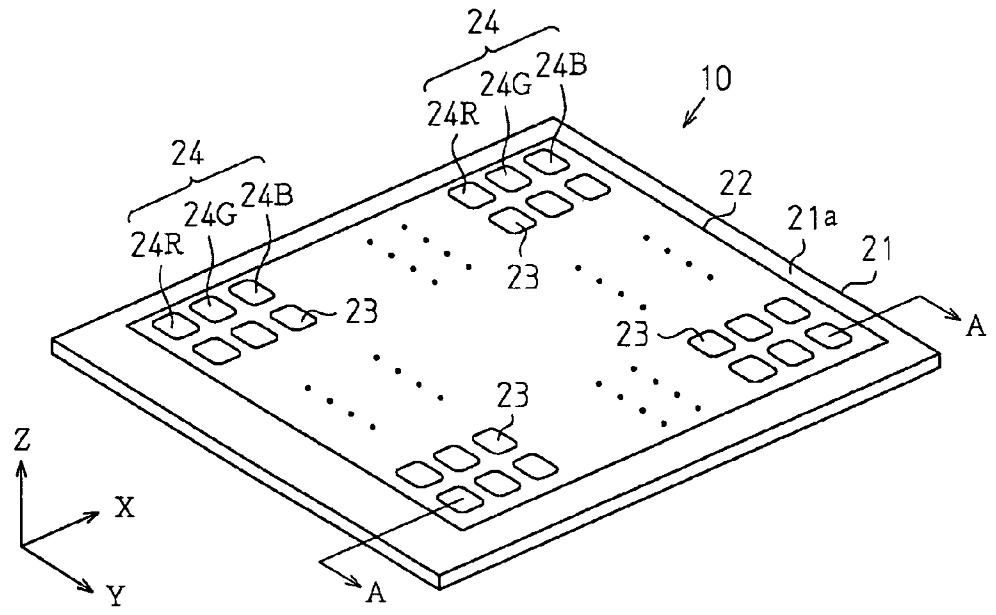
FIG. 2 is a perspective view showing a color filter substrate of the liquid crystal display of FIG. 1.
Figure 3:
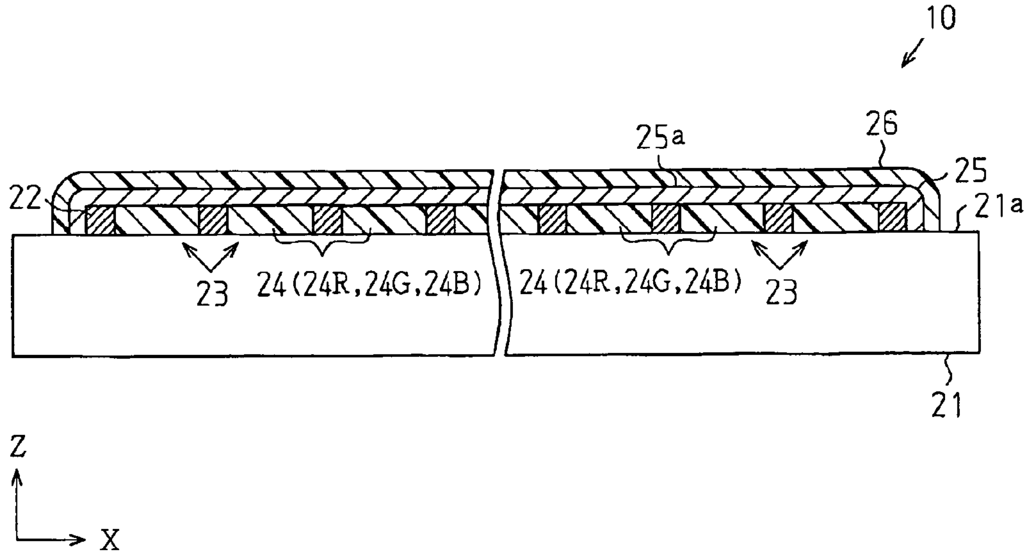
FIG. 3 is a cross-sectional view taken along line A-A of FIG. 2.

First, a liquid crystal display, or an electro-optic device according to the present invention, will be explained. FIG. 1 is a perspective view showing the liquid crystal display and FIG. 2 is a perspective view showing a color filter substrate provided in the liquid crystal display of FIG. 2. FIG. 3 is a cross-sectional view showing a main portion of the color filter substrate.

As shown in FIG. 1, a liquid crystal display 1 includes a liquid crystal panel 2 and an illumination device 3 that illuminates area light L1 with respect to the liquid crystal panel 2.

The illumination device 3 includes a light source 4 such as an LED and a light guide 5 through which the light emitted by the light source 4 transmits. The light is thus illuminated onto the liquid crystal panel 2 as area light. The liquid crystal panel 2 has a color filter substrate 10 and an element substrate 11 opposing the color filter substrate 10. The color filter substrate 10 faces the illumination device 3. The color filter substrate 10 and the element substrate 11 are bonded together and non-illustrated liquid crystal molecules are sealed in the space between the color filter substrate 10 and the element substrate 11.

The element substrate 11 is defined by a rectangular plate-like non-alkaline glass substrate. A plurality of scanning lines 12 extending in direction X are formed and spaced at predetermined intervals on a side surface (an element forming surface 11*a*) of the element substrate 11 that faces the illumination device 3 (the color filter substrate 10). Each of the scanning lines 12 is electrically connected to one of scanning line driver circuits 13, which are formed at an end of the element substrate 11. In correspondence with a scanning control signal from a non-illustrated control circuit, the scanning line driver circuit 13 selectively drives a prescribed one of the scanning lines 12 at a predetermined timing. A scanning signal is sent to the selected scanning line 12.

A plurality of data lines 14 extending in direction Y, which extends perpendicular to the scanning lines 12, are formed and spaced at predetermined intervals on the element forming surface 11*a*. Each of the data lines 14 is electrically connected to a data line driver circuit 15, which is provided at the end of the element substrate 11. In correspondence with display data obtained from a non-illustrated external device, the data line driver circuit 15 generates a data signal. The data signal is sent to the corresponding one of the data lines 14 at a predetermined timing.

A plurality of pixel areas 16 are each defined in a space defined by the corresponding scanning lines 12 and the crossing data lines 14. Each of the pixel areas 16 is connected to the corresponding scanning lines 12 and the associated data lines 14. The pixel areas 16 are arranged in a matrix-like shape defined of "i" lines by "j" rows. A non-illustrated control element defined by a TFT and a pixel electrode formed by a transparent conductive film such as an ITO is formed in each pixel area 16.

In other words, in the first embodiment, the liquid crystal display 1 is an active matrix type liquid crystal display having the TFT, or the control element. The side of the element substrate 11 below the scanning lines 12, the data lines 14, and the pixel areas 16 (the side facing the color filter substrate 10) is subjected to an alignment process by rubbing at the entire element forming surface 11*a*. In this manner, a non-illustrated alignment film is provided for permitting alignment of the liquid crystal molecules in the vicinity of the pixel electrode.

As illustrated in FIG. 2, the color filter substrate 10 includes a rectangular transparent glass substrate (hereinafter, referred to simply as a substrate 21) formed of non-alkaline glass.

Referring to FIGS. 2 and 3, a wall 22 is formed on a side (a filter forming surface 21*a*) of the substrate 21 that faces the element substrate 11. The wall 22 is formed of light shielding material such as chrome or carbon black and has a grid-like shape. The wall 22 is thus provided on a substantially entire portion of the filter forming surface 21*a* in such a manner as to face the scanning lines 12 and the data lines 14. In this manner, spaces defined by the wall 22 (color layer areas 23) are arranged on the filter forming surface 21*a* in a matrix-like shape of "i" lines by "j" rows and opposed to the corresponding pixel areas 16.

As illustrated in FIGS. 2 and 3, color layers 24 (red layers 24R, green layers 24G, and blue layers 24B) are formed in the corresponding color layer areas 23. Each of the color layers 24 converts the light L1 to the light of the corresponding color. Specifically, the red layers 24R, the green layers 24G, and the blue layers 24B convert the light L1 to red light, green light, and blue light, respectively. A non-illustrated protective layer or overcoat layer is deposited on the upper sides of the color layers 24 and the upper side the wall 22 (facing the element forming surface 11*a*). In this manner, an even surface is provided along the upper sides of the color layers 24 and the upper side of the wall 22. Referring to FIG. 3, an opposing electrode 25, which is shaped substantially identical with the wall 22, is formed on the upper sides of the color layers 24 (the upper side of the protective layer or the upper side of the overcoat layer). An upper surface (an alignment film forming surface 25*a*, or an ejection target surface) of the opposing electrode 25 is formed flat in such a manner as to extend along the filter forming surface 21*a*. A predetermined common potential is provided to the opposing electrode 25. An alignment film 26, or a pattern, is formed on the upper side of the opposing electrode 25 (the alignment film forming surface 25*a*). The alignment film 26 permits alignment of liquid crystals in the vicinity of the opposing electrode 25.

The alignment film 26 includes a liquid film 26L having uniform thickness formed by a liquid droplet ejection apparatus 30 (see FIG. 4), which will be described later. The liquid film 26L is then dried and a surface of the liquid film 26L is subjected to an alignment process such as rubbing. The alignment film 26 is thus completed. More specifically, microdroplets Fb (see FIG. 7) containing alignment film forming material, or pattern forming material, are ejected onto the entire alignment film forming surface 25*a* through the ejection nozzles N (see FIG. 5) of the liquid droplet ejection apparatus 30 (see FIG. 4). Subsequently, a laser beam B (see FIG. 10), which will be explained later, is radiated onto each of the microdroplets Fb on the alignment film forming surface 25*a* in order to even the microdroplets Fb.

Then, as the scanning line driver circuit 13 performs the line progressive scan, or sequentially selects the scanning lines 12 one by one, the corresponding control elements are held in an ON state for a corresponding period. When one of the control elements is turned on, the data signal generated by the data line driver circuit 15 is sent to the pixel electrode through the data lines 14 and the control element. Thus, in correspondence with the difference between the potential of the pixel electrode of the element substrate 11 and the potential of the opposing electrode 25 of the color filter substrate 10, the alignment state of the liquid crystal molecules is maintained in such a manner as to modulate the light L1 radiated by the illumination device 3. Accordingly, through selective transmission of the modulated light through a non-illustrated polarization plate, a desired full-color image is displayed on the liquid crystal panel 2 through the color filter substrate 10.

Figure 4:
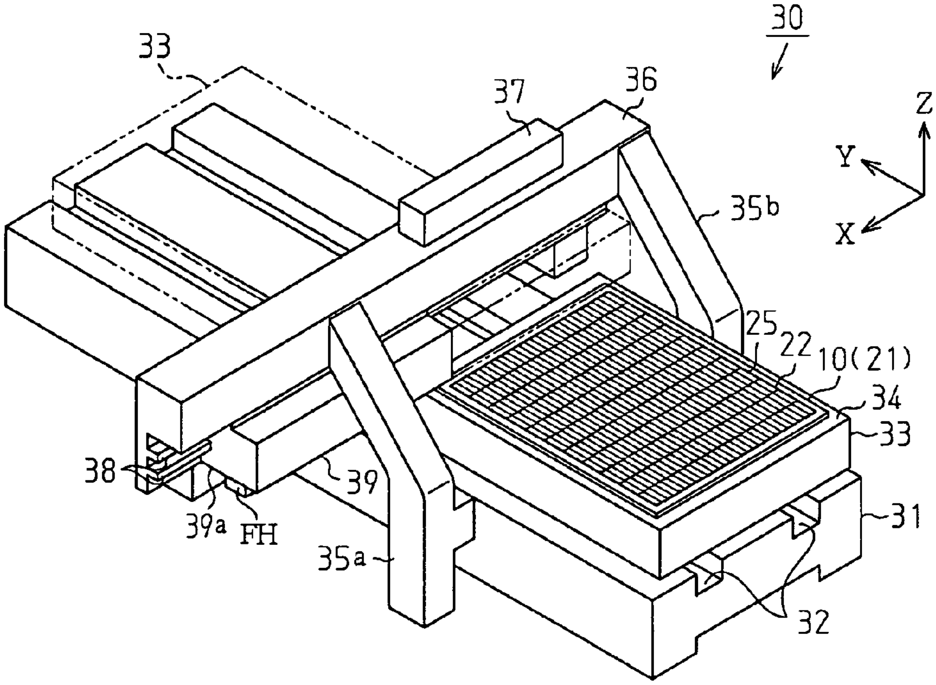
FIG. 4 is a perspective view schematically showing a liquid droplet ejection apparatus according to the first embodiment.

Next, the liquid droplet ejection apparatus 30 used for forming the color layers 24 will be explained. FIG. 4 is a perspective view showing the configuration of the liquid droplet ejection apparatus 30.

As shown in FIG. 4, the liquid droplet ejection apparatus 30 includes a parallelepiped base 31. When the color filter substrate 10 is mounted on a substrate stage 33, which will be explained later, the longitudinal direction of the base 31 extends in direction Y.

A pair of guide grooves 32 extending in direction Y are defined in an upper surface of the base 31 along the entire width of the base 31 in direction Y. The substrate stage 33, or scanning means (or a scanning mechanism), is supported by the guide grooves 32. The substrate stage 33 is operably connected to a Y-axis motor MY (see FIG. 12) and thus moves lineally in direction Y and a direction opposite to direction Y. When a prescribed drive signal is provided to the Y-axis motor MY, the Y-axis motor MY rotates in a forward or reverse direction. The substrate stage 33 thus proceeds or retreats in direction Y (moves in direction Y) at a predetermined speed (transport speed Vy). In the first embodiment, referring to FIG. 4, the position of the base 31 rearmost in direction Y is referred to as a proceed position. The position of the substrate stage 33 foremost in direction Y (as indicated by the corresponding double-dotted lines of FIG. 4) is referred to as a retreat position.

A mounting portion 34 is formed on an upper surface of the substrate stage 33. The substrate 21 is mounted on the mounting portion 34 with the alignment film forming surface 25*a* facing upward. In this manner, the substrate 21 is positioned with respect to the substrate stage 33. A pair of support tables 35*a*, 35*b* are formed at opposing sides of the base 31 in direction X. A guide member 36, which extends in direction X, is supported by the support tables 35*a*, 35*b*. A reservoir 37 is arranged on the guide member 36 and retains alignment film forming liquid F (see FIG. 7), which is prepared by dispersing the alignment film forming material, or the pattern forming material, in dispersion medium. The alignment film forming liquid F is sent from the reservoir 37 to liquid droplet ejection heads FH, which will be described later. In the first embodiment, the surface tension of the alignment film forming liquid F is 20 mN/m. However, the present invention is not restricted to this.

A pair of guide rails 38 extending in direction X are arranged below the guide member 36 substantially at the entire width of the guide member 36 in direction X. A carriage 39 is supported by the guide rails 38. The carriage 39 is operably connected to an X-axis motor MX (see FIG. 12) and thus linearly moves in direction X and a direction opposite to direction X. The width of the carriage 39 in direction X is substantially equal to the width of the substrate 21 (the filter forming surface 21*a*) in direction X. In response to a prescribed drive signal sent to the X-axis motor MX, the X-axis motor rotates in a forward or reverse direction. The carriage 39 thus proceeds or retreats in direction X (moves in direction X). In the first embodiment, referring to FIG. 4, the position of the carriage 39 closest to the support table 35*a* (foremost in direction X) is referred to as a proceed position. The position of the carriage 39 closest to the support table 35*b* (rearmost in direction X, as indicated by the corresponding double-dotted broken lines of FIG. 4) is referred to as a retreat position.

Figure 5:
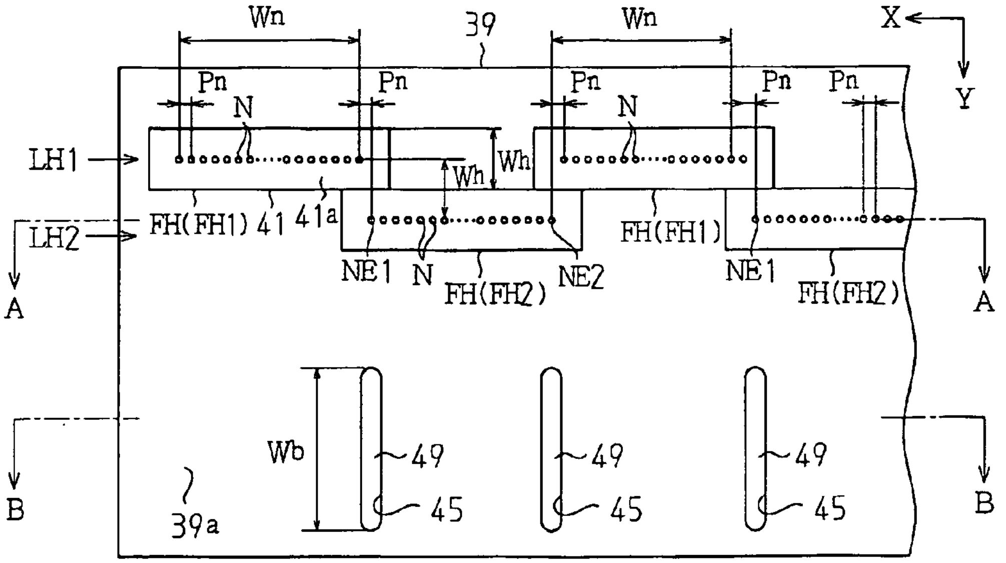
FIG. 5 is a plan view for explaining liquid droplet ejection heads and radiation ports of the liquid droplet ejection apparatus of FIG. 4.
Figure 6:
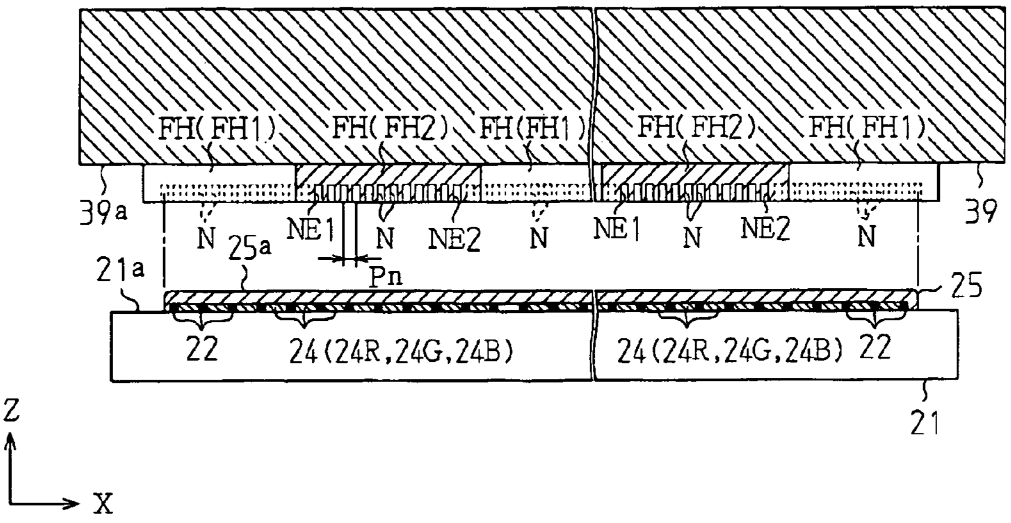
FIG. 6 is a cross-sectional view taken along line A-A of FIG. 5.
Figure 7:
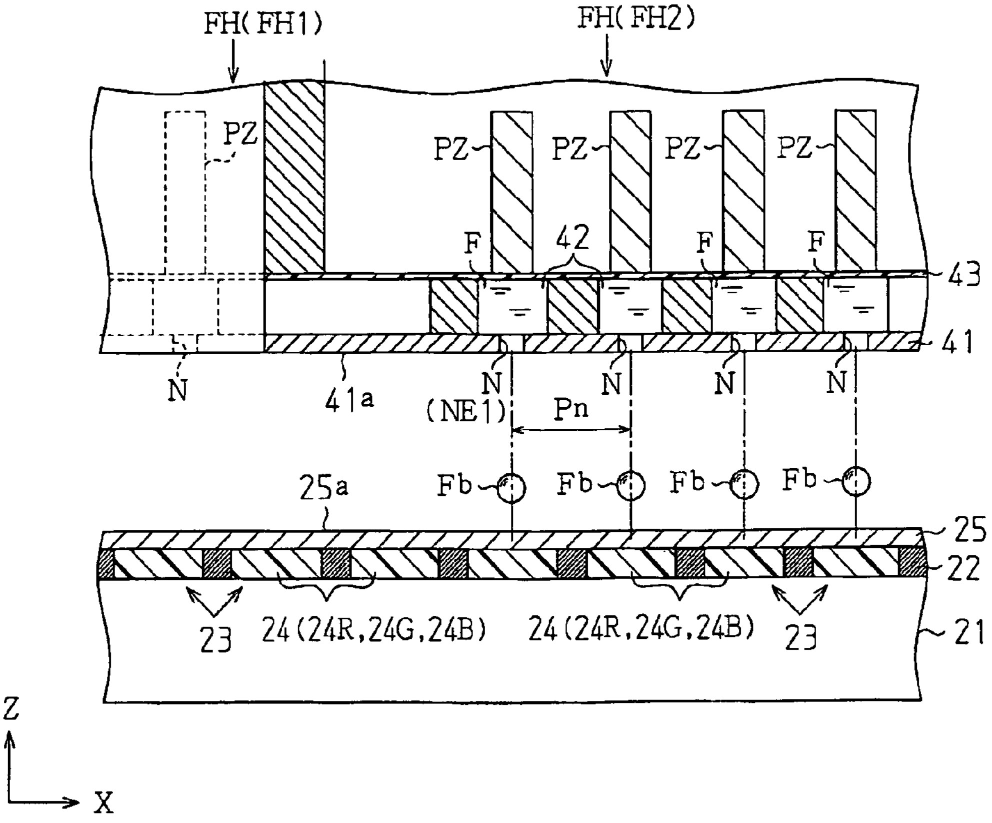
FIG. 7 is an enlarged cross-sectional view showing a portion of FIG. 6.

A plurality of ejection heads (hereinafter, referred to simply as "ejection heads FH"), or liquid droplet ejection means (or liquid droplet ejecting portions), are formed on a lower surface (a head surface 39*a*) of the carriage 39. FIG. 5 is a plan view showing the head surface 39*a* as viewed from below (from a side corresponding to the substrate stage 33). FIGS. 6 and 7 are a schematic cross-sectional view and an enlarged schematic cross-sectional view, both taken along line A-A of FIG. 5.

Referring to FIG. 5, each of the ejection heads FH has a substantially parallelepiped shape and extends in direction X. The ejection heads FH are arranged in two lines in direction X. Specifically, the ejection heads FH are aligned along a first head line LH1 and a second head line LH2. The first head line LH1 includes the ejection heads FH (first ejection heads FH1) that are located rearward in direction Y (closer to the proceed position of the substrate stage 33). The second head line LH2 includes the ejection heads FH (second ejection heads FH2) that are located forward from and adjacent to the first head line LH1 in direction Y. In each of the first and second head lines LH1, LH2, the ejection heads FH are arranged at equal pitches and thus spaced at predetermined intervals in direction X. As viewed in direction Y, each of the second ejection heads FH2 is arranged in the space between the corresponding adjacent pair of the first ejection heads FH1.

A nozzle plate 41 is provided on a lower side (a side facing the substrate stage 33) of each of the first and second ejection heads FH1, FH2. A number of nozzles N are defined in a lower surface (a nozzle forming surface 41*a*) of each of the nozzle plates 41 and each extend in a normal direction of the substrate 21 (direction Z, see FIG. 4). The nozzles N eject the microdroplets Fb (see FIG. 7), which will be explained later. The nozzles N of each ejection head FH are aligned in a single line in direction X and spaced at a pitch corresponding to a constant pitch width (a nozzle pitch width Pn) in direction X. Accordingly, a nozzle line having a predetermined width in direction X (a nozzle line width Wn) is defined in each ejection head FH (each nozzle forming surface 41).

More specifically, as viewed in direction X, each nozzle line of the first head line LH1 is spaced from the corresponding nozzle line of the second head line LH2 by a distance corresponding to the width of each ejection head FH in direction Y (the head width Wh). Further, as viewed in direction Y, the nozzle line of each first ejection head FH1 is spaced from the nozzle line of the corresponding second ejection head FH2 by a distance corresponding to the nozzle pitch width Pn.

Therefore, referring to FIG. 6, the nozzles N of the first and second ejection heads FH1, FH2 define a single continuous nozzle line at the nozzle pitch width Pn, as viewed in direction Y. The width of the nozzle line defined by the nozzles N of the first and second ejection heads FH1, FH2 in direction X corresponds to the width of the alignment film forming surface 25*a* in direction X.

In other words, in the liquid droplet ejection apparatus 30 of the first embodiment, the first ejection heads FH1 and the second ejection heads FH2 are alternately arranged in direction X, thus defining the continuous line of the nozzles N. The nozzles N are spaced in direction X at the pitch width corresponding to the nozzle pitch width Pn. The line of the nozzles N are arranged to be opposed to the alignment film forming surface 25*a* along the entire width of the alignment film forming surface 25*a* in direction X.

In the first embodiment, in the nozzle line of each second ejection head FH2, the nozzle located foremost in direction X is referred to as an overlapping nozzle NE1. The nozzle located rearmost in direction X is referred to as an overlapping nozzle NE2.

As shown in FIG. 7, a cavity 42, or a pressure chamber, is defined in each of the nozzles N and extends in direction Z. Each of the cavities 42 communicates with the reservoir 37 through a non-illustrated supply line. The alignment film forming liquid F is thus sent from the reservoir 37 to the cavities 42. Each cavity 42 supplies the alignment film forming liquid F to the associated nozzle N. An oscillation plate 43 is provided at the sides of the cavities 42 located forward in direction Z. The oscillation plate 43 oscillates in direction Z and a direction opposite to direction Z. In this manner, the volume of each cavity 42 is selectively increased and decreased. Piezoelectric elements PZ are arranged at the side of the oscillation plate 43 forward in direction Z and in correspondence with the nozzles N. Each of the piezoelectric elements PZ contracts and extends in response to a signal (a piezoelectric element drive signal COM1, see FIG. 12) for driving the piezoelectric element PZ. This oscillates the oscillation plate 43 in direction Z and the direction opposite to direction Z.

Specifically, when the alignment film forming surface 25*a* moves and the end of the alignment film forming surface 25*a* located foremost in direction Y reaches the position immediately below the first head line LH1, the piezoelectric elements PZ of each first ejection head FH1 are actuated. This increases and decreases the volume of each cavity 42, thus simultaneously ejecting the alignment film forming liquid F through all of the nozzles N of each first ejection head FH1 as the microdroplets Fb by an amount corresponding to the decreased volume of the cavity 42. The microdroplets Fb thus travel in the direction opposite to direction Z and are simultaneously received by the end of the alignment film forming surface 25*a* foremost in direction Y.

Figure 8A:
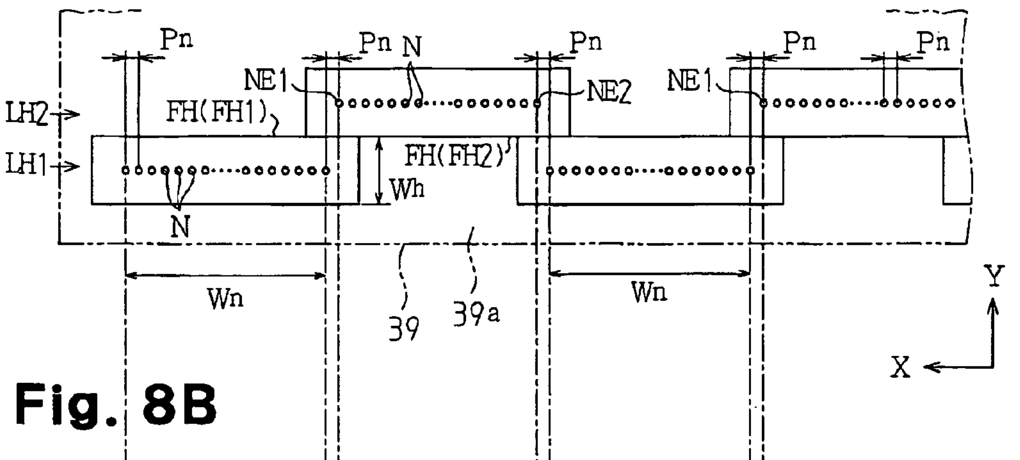
FIGS. 8A, 8B, 8C, 9A, 9B, and 9C are views for explaining the positions of the liquid droplet ejection heads and droplets received by a substrate.
Figure 8B:
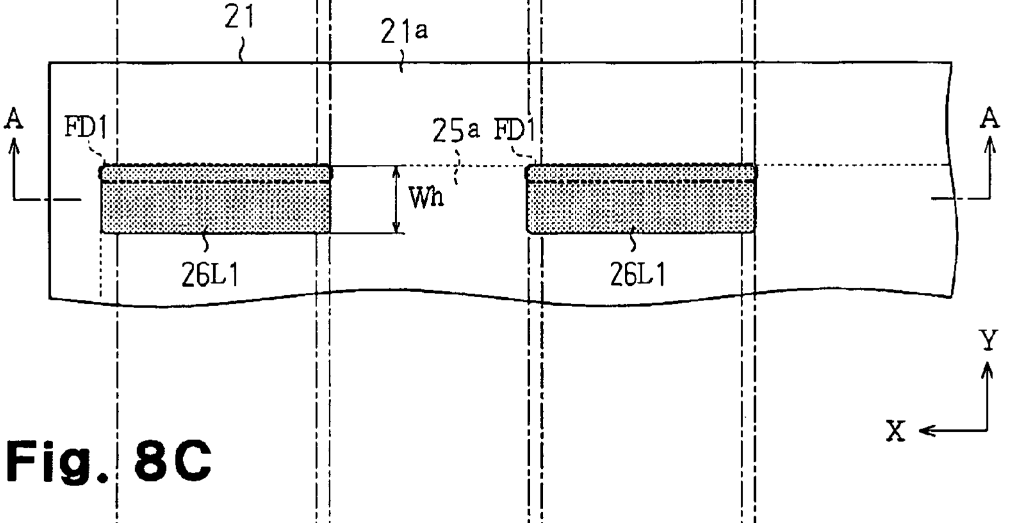
Figure 8C:
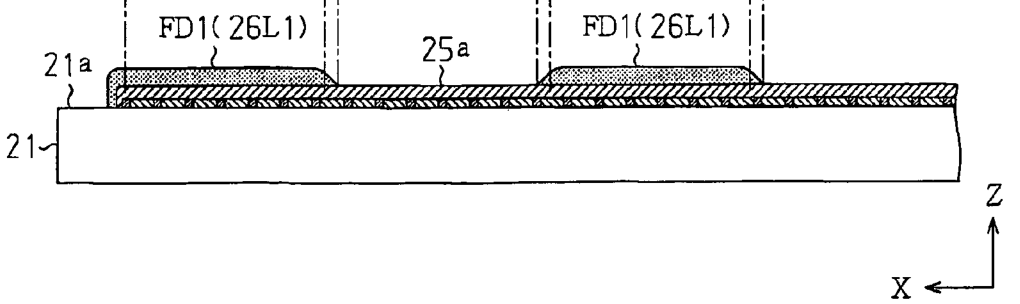

FIGS. 8A, 8B, and 8C are views for explaining the microdroplets Fb ejected by the first ejection head FH1 and received by the alignment film forming surface 25*a*. FIG. 8A is a plan view showing each of the ejection heads FH1, FH2 as viewed from the side corresponding to the carriage 39. FIG. 8B is a plan view showing the alignment film forming surface 25*a* as viewed from the side corresponding to the carriage 39. FIG. 8C is a cross-sectional view schematically showing a main portion of the alignment film forming surface 25*a* taken along line A-A of FIG. 8B.

After having been ejected from the first head line LH1 and received by the alignment film forming surface 25*a*, the microdroplets Fb move in such a manner as to minimize the surface energy in the boundary between the alignment film forming surface 25*a* and the atmospheric air. In other words, with reference to FIGS. 8A and 8B, after having been ejected from the first head line LH1, the microdroplets Fb gather to define first elongated droplets FD1 (as indicated by the broken lines of FIG. 8B), which extend in direction X, on the alignment film forming surface 25*a* at positions opposing the nozzle lines of the first ejection heads FH1. The width of each first droplet FD1 in direction X is slightly greater than the nozzle line width Wn.

As the substrate 21 (the alignment film forming surface 25*a*) is transported in direction Y, the microdroplets Fb are repeatedly ejected from the first ejection heads FH1. The first droplets FD1 are connected together in such a manner as to extend in direction Y by an amount corresponding to the transport distance of the alignment film forming surface 25*a*. The first droplets FD1 that have been connected together thus form a lower liquid film layer 26L1.

Subsequently, after the end of the alignment film forming surface 25*a* foremost in direction Y has moved in direction Y by the distance corresponding to the head width Wh, the piezoelectric elements PZ of the second ejection heads FH2 are actuated. This causes all of the nozzles N of the second ejection heads FH2 to eject the microdroplets Fb. After having been ejected, the microdroplets Fb travel in the direction opposite to direction Z and reach the end of the alignment film forming surface 25*a* foremost in direction Y.

Figures 9A, 9B, 9C:
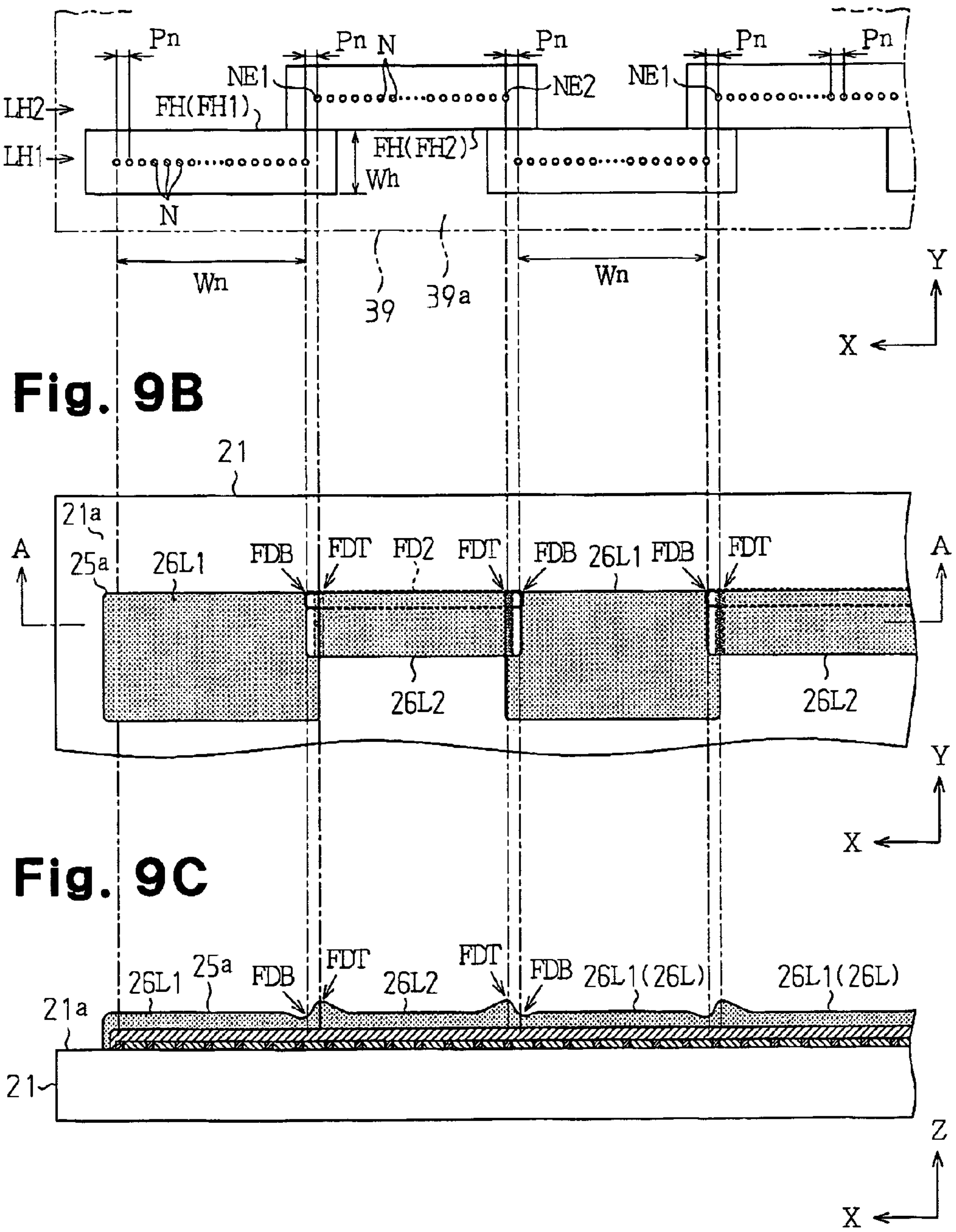

FIGS. 9A, 9B, and 9C are views for explaining the microdroplets Fb ejected by the second ejection heads FH2 and received by the alignment film forming surface 25*a*. FIG. 9A is a plan view showing each of the ejection heads FH1, FH2 as viewed from the side corresponding to the carriage 39. FIG. 9B is a plan view showing the alignment film forming surface 25*a* as viewed from the side corresponding to the carriage 39. FIG. 9C is a cross-sectional view schematically showing a main portion of the alignment film forming surface 25*a* taken along line A-A of FIG. 9B.

After having been ejected from the second head line LH2 and received by the alignment film forming surface 25*a*, the microdroplets Fb flow in such a manner as to minimize the surface energy in the boundary between the alignment film forming surface 25*a* and the atmospheric air. Further, with reference to FIGS. 9A and 9B, the microdroplets Fb gather and define second elongated droplets FD2 (as indicated by the broken lines of FIG. 9B), which extend in direction X, at positions opposing the nozzle lines of the second head line LH2. The width of each second droplet FD2 in direction X is slightly greater than the nozzle line width Wn.

Each of the opposing ends of each second droplet FD2 in direction X thus overlaps the corresponding end of the adjacent lower liquid film layer 26L1, which has been formed earlier. As illustrated in FIG. 9C, this forms a projected portion FDT (an overlapping area as a boundary area) that has a top portion immediately below the corresponding overlapping nozzle NE1, NE2 and is projected in direction Z. Also, a side of each projected portion FDT corresponding to the first droplet FD1 corresponds to an end of the first droplet FD1 (a recessed portion FDB as a non-overlapping area) at which the first droplet FD1 is not overlapped by the adjacent second droplet FD2.

The difference between the height of each projected portion FDT and the height of each recessed portion FDB is relatively small, or approximately several micrometers. This reduces change of the surface energy of each second droplet FD2 (each first droplet FD1), which is obtained by evening the projected portions FDT and the recessed portions FDB.

As a result, the energy produced by evening the projected portions FDT and the recessed portions FDB is insufficient for moving the first droplets FD1 and the second droplets FD2. That is, unless external energy is applied to the second droplets FD2 (the first droplets FD1), the difference between the height of each projected portion FDT and the height of each recessed portion FDB is maintained.

As the substrate 21 (the alignment film forming surface 25*a*) is transported in direction Y, the microdroplets Fb are repeatedly ejected from the first ejection heads FH1 and the second ejection heads FH2. Thus, referring to FIG. 9B, the second droplets FD2 are connected together in such a manner as to extend in direction Y by an amount corresponding to the transport distance of the alignment film forming surface 25*a*. The second droplets FD2 that have been connected together thus form an upper liquid film layer 26L2. Meanwhile, each of the second droplets FD2 forms the projected portion FDT and the recessed portion FDB in direction Y over a distance corresponding to the transport distance of the alignment film forming surface 25*a*.

In other words, as the microdroplets Fb are ejected from the first and second head lines LH1, LH2, the liquid film 26L is formed on the alignment film forming surface 25*a* by the lower liquid film layers 26L1 and the upper liquid film layers 26L2. This forms the projected portions FDT and the recessed portions FDB in the boundaries between the lower liquid film layers 26L1 and the upper liquid film layers 26L2. Each projected portion FDT and the associated recessed portion FDB extend along the entire width of the corresponding boundary in direction Y.

As shown in FIG. 5, radiation ports 45 are defined in the head surface 39*a* of the carriage 39 at positions forward from the overlapping nozzles NE1, NE2 in direction Y. Each of the radiation ports 45 is defined by a through hole extending in direction Y and communicating with the interior of the carriage 39. The width of each radiation port 45 in direction Y defines a beam length Wb.

Figure 10:
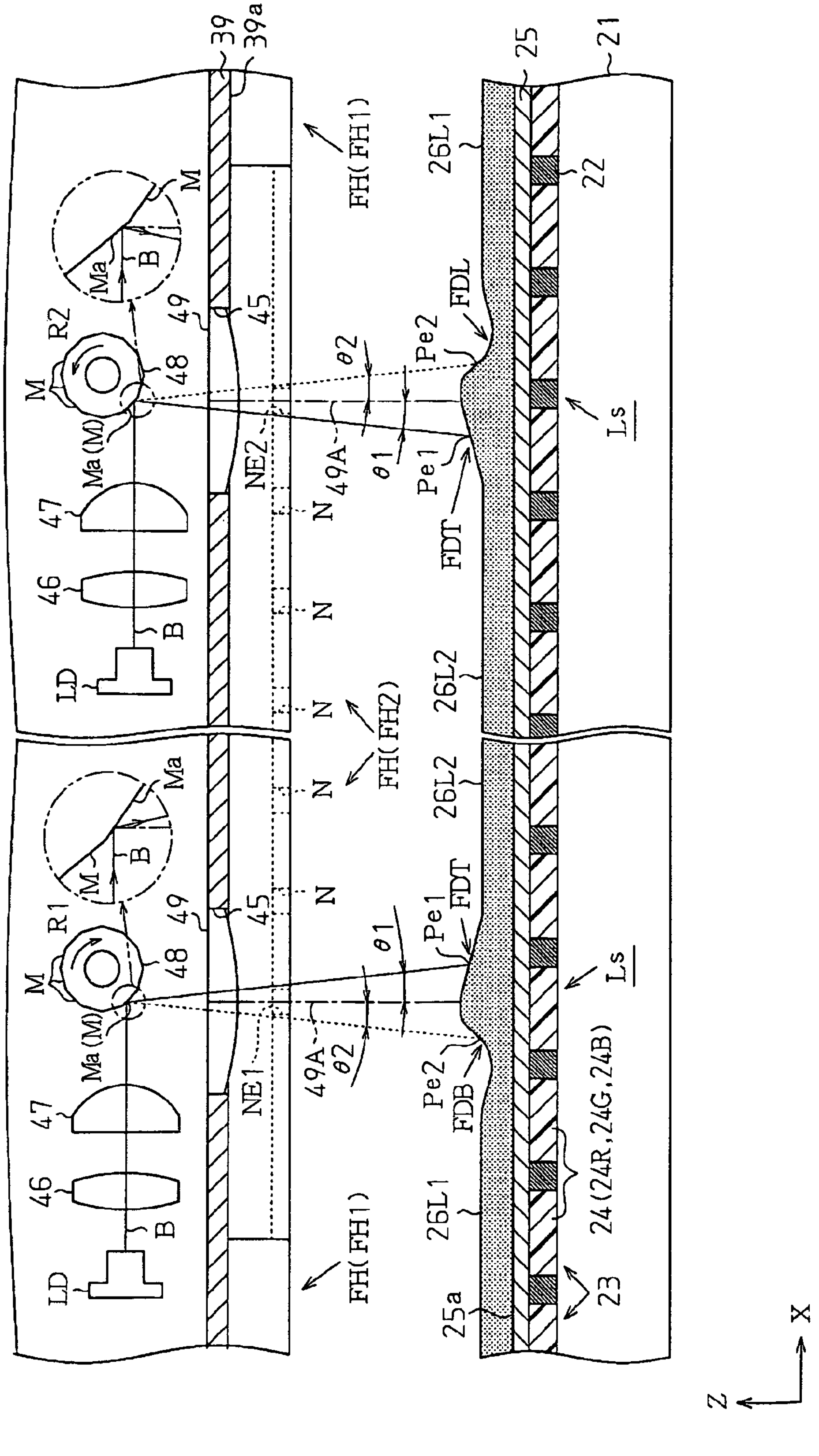
FIG. 10 is a view for explaining scanning areas of laser beams.

As illustrated in FIG. 10, semiconductor lasers LD, or energy beam radiation means (or energy beam radiating portions), are arranged in the carriage 39 in correspondence with the radiation ports 45. Each of the semiconductor lasers LD radiates a laser beam B, or an energy beam, in response to a signal (a laser drive signal COM2, see FIG. 12) for driving the semiconductor laser LD. In the first embodiment, the laser beam B is defined by the light in a wavelength range that evaporates the dispersion medium from the lower and upper liquid film layers 26L1, 26L2 or converts the optical energy of the light into translational movement of the molecules forming the lower and upper liquid film layers 26L1, 26L2.

At a side of each semiconductor laser LD corresponding to the radiation port 45 in the carriage 39, a collimator 46, a cylindrical lens 47, a polygon mirror 48 defining scanning means (or a scanning mechanism), and a scanning lens 49 are arranged in this order from the side closer to the semiconductor laser LD. Each of the collimators 46 forms a parallel light flux from the laser beam B radiated by the corresponding semiconductor laser LD and guides the light flux to the associated cylindrical lens 47. Each of the cylindrical lenses 47 has curvature only along direction Z and corrects an optical face tangle error of the associated polygon mirror 48. The cylindrical lens 47 thus guides the elongated laser beam B extending in direction Y (in direction perpendicular to the sheet surface of FIG. 10) to the polygon mirror 48.

Each of the polygon mirrors 48 is provided as opposed to the associated radiation port 45 and includes thirty six reflective surfaces M. The reflective surfaces M are arranged in such a manner as to define a regular triacontakaihexagon (thirty-six sided polygon). The width of each polygon mirror 48 in direction Y (a direction perpendicular to the sheet surface of FIG. 10) is defined by the beam length Wb, like the radiation ports 45. Each polygon mirror 48 is actuated by a polygon motor (see FIG. 12) and rotates in a manner that each of the reflective surfaces M revolves in direction R1 or direction R2 in correspondence with the associated overlapping nozzles NE1, NE2. Each polygon mirror 48 deflects and reflects the elongated laser beam B, which has passed through the associated cylindrical lens 47, by the corresponding reflective surface M. The laser beam B is then guided to the associated scanning lens 49. In correspondence with every 10 degree shift of the rotational angle $\theta p$ of the polygon mirror 48 in direction R1 (direction R2), the polygon mirror 48 switches from one reflective surface M to a following reflective surface M, which receives the laser beam B. In the first embodiment, the rotational speed of each polygon mirror 48 is sufficiently greater than the transport speed Vy.

Each of the scanning lenses 49 is defined by an f-theta lens that guides the laser beam B deflected and reflected by the associated polygon mirror 48 onto the alignment film forming surface 25*a*. The scanning lens 49 maintains the scanning speed of the laser beam B on the alignment film forming surface 25*a* at a constant level. As viewed in direction Y, an optical axis 49A of each scanning lens 49 coincides with the axis of the associated overlapping nozzle NE1, NE2.

In the first embodiment, referring to FIG. 10, it is defined that the rotational angle $\theta p$ of each polygon mirror 48 is zero degrees when the laser beam B is received by an end of each reflective surface M foremost in direction R1 (direction R2), or, specifically, when the deflection angle of the laser beam B, which has been reflected and deflected, corresponds to a deflection angle $\theta 1$ with respect to the optical axis 49A of the scanning lens 49. In the first embodiment, the deflection angle $\theta 1$ is approximately 5-degrees at the side corresponding to the overlapping nozzle NE1 and −5 degrees at the side corresponding to the overlapping nozzle NE2.

If the laser beam B is guided to the cylindrical lens 47 when the rotational angle $\theta p$ of each polygon mirror 48 is zero degrees, the cylindrical lens 47 adjusts the optical axis of the laser beam B with respect to a direction perpendicular to the sheet surface of FIG. 10. The laser beam B is then guided to the associated polygon mirror 48. The polygon mirror 48 then reflects and deflects the laser beam B by the corresponding reflective surface M (a reflective surface Ma) in accordance with the deflection angle $\theta 1$ with respect to the optical axis 49A. The laser beam B is then guided to the alignment film forming surface 25*a* through the scanning lens 49. The laser beam B defines an elongated laser beam cross section (a beam spot Bs, which is indicated by the broken lines and the heavy lines of FIG. 11B) on the alignment film forming surface 25*a*. The width of each laser beam cross section in direction Y is equal to the beam length Wb.

In the first embodiment, the position at which each beam spot Bs is defined when the rotational angle $\theta p$ is zero degrees is referred to as a scanning start position Pe1. With reference to FIG. 10, as viewed in direction Y, the scanning start position Pe1 is located offset toward the upper liquid film layer 26L2 at the deflection angle $\theta 1$ from the top of the projected portion FDT, or the axis of the overlapping nozzle NE1, NE2 (the axis 49A of the scanning lens 49).

Subsequently, each polygon mirror 48 is rotated in direction R1 (direction R2) and the rotational angle θp of the polygon mirror 48 becomes substantially 10 degrees. The polygon mirror 48 then reflects and deflects the laser beam B by the end of the reflective surface Ma foremost in a direction opposite to direction R1 (a direction opposite to direction R2) in accordance with the deflection angle θ2 with respect to the optical axis 49A, as indicated by the broken lines of FIG. 10. The laser beam B is then guided to the alignment film forming surface 25*a* through the scanning lens 49. The laser beam B defines an elongated beam spot Bs (which is indicated by the heavy lines of FIG. 11B) on the alignment film forming surface 25*a*. The width of each beam spot Bs in direction Y is equal to the beam length Wb. In the first embodiment, the deflection angle θ2 is approximately −5 degrees at the side corresponding to the overlapping nozzle NE1 and 5 degrees at the side corresponding to the overlapping nozzle NE2.

In the first embodiment, the position at which each beam spot Bs is defined when the rotational angle θp is approximately 10 degrees is referred to as a scanning end position Pe2. The zone between the scanning end position Pe2 and the scanning start position Pe1 is referred to as a scanning area Ls. With reference to FIG. 10, as viewed in direction Y, the scanning start position Pe2 is located offset toward the lower liquid film layer 26L1 (the recessed portion FDB) at the deflection angle θ2 from the top of the projected portion FDT, or the axis of the overlapping nozzle NE1, NE2 (the axis 49A of the scanning lens 49).

In other words, through deflection and reflection by each polygon mirror 48, each beam spot Bs is scanned from the side of the projected portion FDT corresponding to the upper liquid film layer 26L2 toward the recessed portion FDB through the projected portion FDT.

When the liquid film 26L having the projected portions FDT and the recessed portions FDB reaches the scanning areas Ls, the polygon motor MP is actuated and the laser beams B are radiated from the semiconductor lasers LD. In this manner, each of the beam spots Bs formed by the laser beam B is repeatedly scanned from the side of the projected portion FDT corresponding to the upper liquid film layer 26L2 to the associated recessed portion FDB.

Figure 11A:
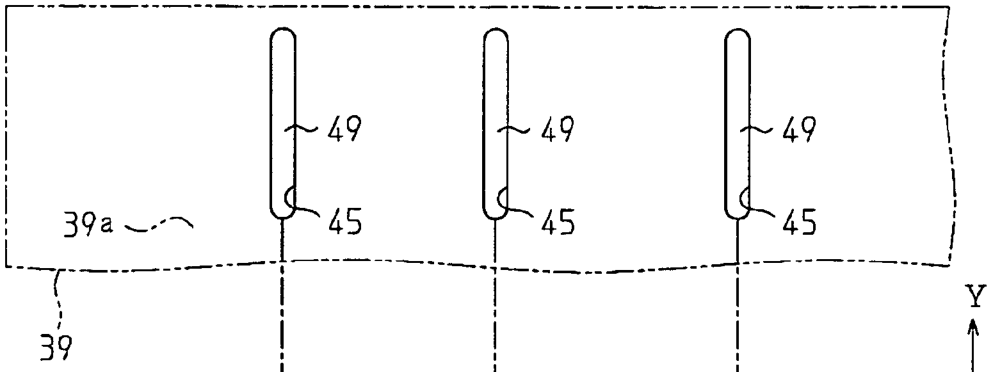
FIGS. 11A, 11B, and 11C are views for explaining the positions of the radiation ports and the droplets received by the substrate.
Figure 11B:
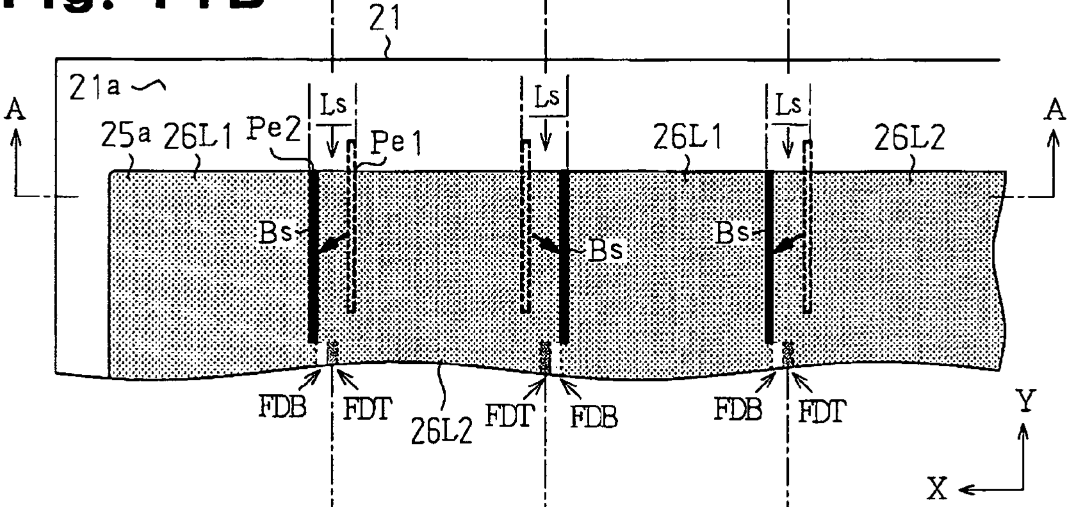
Figure 11C:
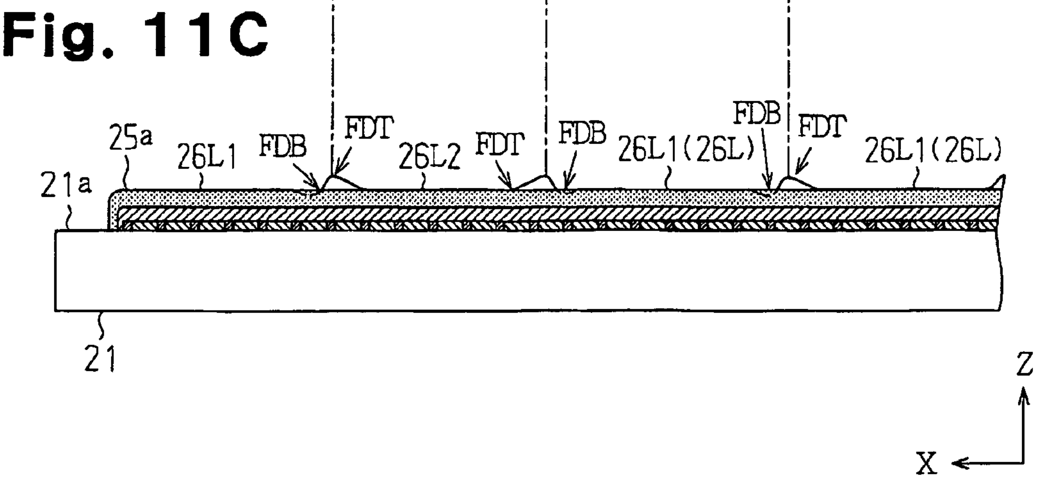

FIGS. 11A, 11B, and 11C are views for explaining the lower liquid film layers 26L1 and the upper liquid film layers 26L2 that have been scanned by the laser beams B. FIG. 11A is a plan view showing the radiation ports 45 as viewed from the side corresponding to the carriage 39. FIG. 11B is a plan view showing the liquid film 26L (the lower liquid film layers 26L1 and the upper liquid film layers 26L2) as viewed from the side corresponding to the carriage 39. FIG. 11C is a cross-sectional view schematically showing a main portion of the liquid film 26L taken along line A-A of FIG. 11B.

When the liquid film 26L having the projected portions FDT and the recessed portions FDB reaches the scanning areas Ls, the elongated beam spots Bs (indicated by the broken lines of FIG. 11B) are each radiated relatively to the liquid film 26L in the synthetic direction (indicated by the corresponding arrows of FIG. 11B) of the scanning direction of each polygon mirror 48 (direction X or the direction opposite to direction X) and the transport direction of the substrate stage 33 (direction Y). In other words, each beam spot Bs moves relatively to the liquid film 26L in the synthetic direction of the facing direction of each projected portion FDT with respect to the associated recessed portion FDB and the extending direction of the projected portion FDT (the recessed portion FDB). The beam spot Bs is thus scanned from the scanning start position Pe1 to the scanning end position Pe2.

In this state, the optical energy of each laser beam B is converted to energy for exciting molecules, such as energy for oscillating the dispersion medium or the like and energy for causing translational movement along the incoming direction of the laser beam B (the photons) in the dispersion medium or the like, solely at a restricted portion of the liquid film 26L. In other words, the optical energy of the laser beam B focally evaporates the dispersion medium from the vicinity of the beam spot Bs, or provides the energy for causing the translational movement along the incoming direction of the laser beam B in the dispersion medium in the vicinity of the beam spot Bs.

As a result, in the scanning areas Ls, the liquid film 26L receives counter action of evaporation of the dispersion medium or reactive force acting in the incoming direction of the laser beam B. The liquid film 26L thus moves in the scanning direction of each laser beam B (each beam spot Bs). In other words, in the scanning areas Ls, the liquid film 26L flows in the facing direction of each upper liquid film layer 26L2 (projected portion FDT) with respect to the associated lower liquid film layer 26L1 (recessed portion FDB) and the extending direction of each projected portion FDT (each recessed portion FDB). This moves the alignment film forming liquid F from an area corresponding to the projected portion FDT to an area corresponding to the recessed portion FDB.

As the substrate 21 (the alignment film forming surface 25*a*) moves in direction Y, scanning of the laser beams B from the radiation ports 45 is repeated. With reference to FIGS. 11B and 11C, such scanning cancels the projected portions FDT and the recessed portions FDB of the liquid film 26L by an amount corresponding to the transport distance of the alignment film forming surface 25*a*. The boundaries between the projected portions FDT and the recessed portions FDB are thus evened so that the thickness of the liquid film 26L becomes uniform.

The electric configuration of the liquid droplet ejection apparatus 30, which is constructed as above-described, will hereafter be explained with reference to FIG. 10.

Figure 12:
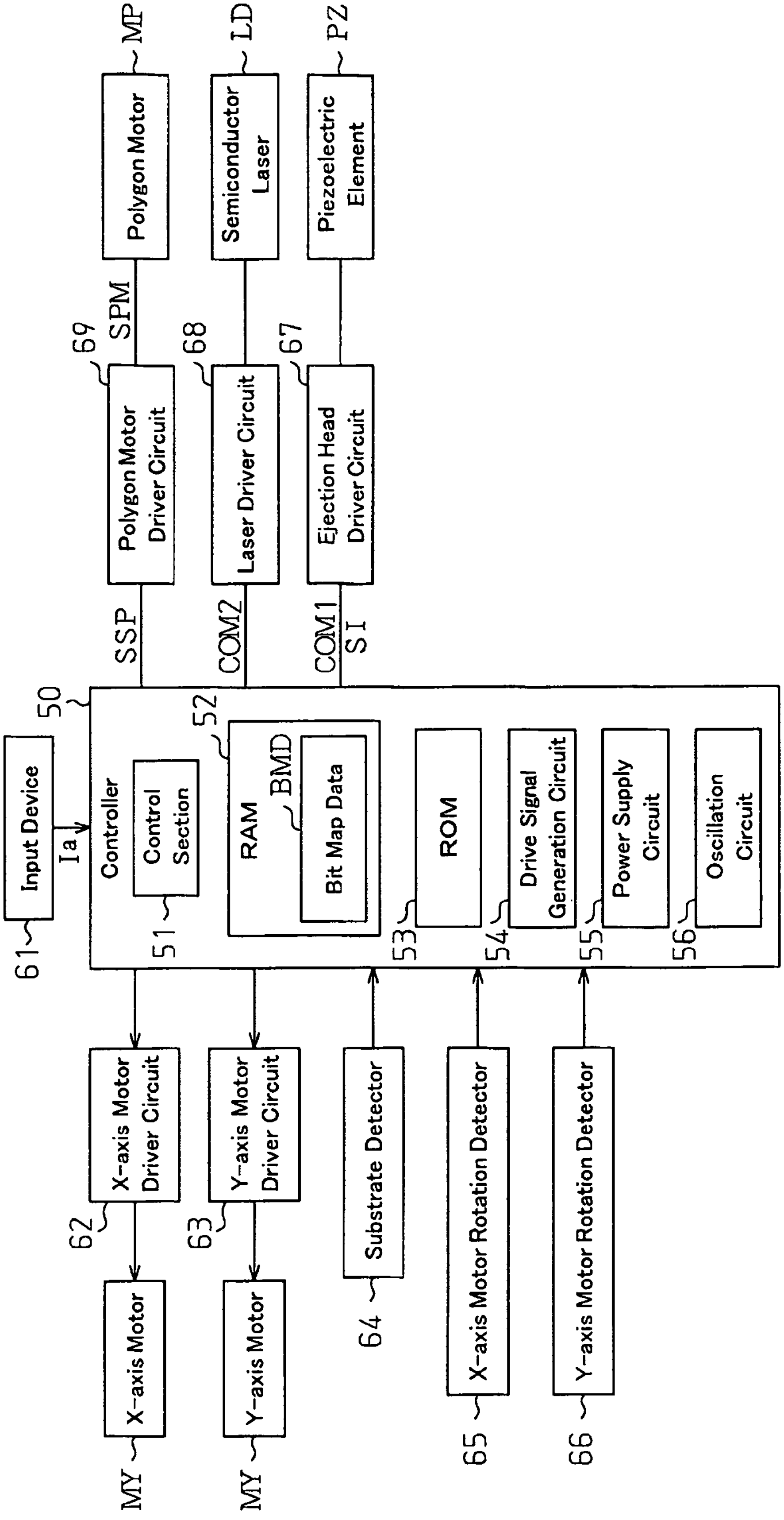
FIG. 12 is an electric block diagram representing the electric configuration of the liquid droplet ejection apparatus of FIG. 4.

Referring to FIG. 12, a controller 50 includes a control section 51 defined by a CPU, a RAM 52 defined by a DRAM and a SPRAM for storing different data, and a ROM 53 that stores different control programs. The controller 50 further includes a drive signal generation circuit 54, a power supply circuit 55, and an oscillation circuit 56. The drive signal generation circuit 54 generates the piezoelectric element drive signal COM1 and the power supply circuit 55 generates the laser drive signal COM2. The oscillation circuit 56 generates a clock signal for synchronizing different signals. In the controller 50, the control section 51, the RAM 52, the ROM 53, the drive signal generation circuit 54, the power supply circuit 55, and the oscillation circuit 56 are connected together through a non-illustrated bus.

An input device 61 is connected to the controller 50. The input device 61 has manipulation switches such as a start switch and a stop switch. A manipulation signal is generated through manipulation of each switch and sent to the controller 50 (the control section 51). The input device 61 provides information necessary for forming the alignment film 26 (the liquid film 26L) on the color filter substrate 10 to the controller 50 as film forming data Ia. In accordance with the film forming data Ia provided by the input device 61 and a control program (such as an alignment film forming program) stored in the ROM 53, the controller 50 performs a transport procedure on the substrate 21 (the alignment film forming surface 25*a*) by moving the substrate stage 33 and a liquid droplet ejection procedure by exciting the piezoelectric elements PZ of the ejection heads FH. Further, in accordance with the alignment film forming program, the controller 50 actuates the semiconductor lasers LD and performs an evening procedure for evening the liquid film 26L.

More specifically, the control section 51 carries out a prescribed development procedure on the film forming data Ia sent by the input device 61. The control section 51 thus generates bit map data BMD indicating positions on a two-dimensional film forming plane (the alignment film forming surface 25*a*) at which the microdroplets Fb must be ejected. The bit map data BMD is stored in the RAM. According to the bit values (0 or 1) of the bit map data BMD, the piezoelectric elements PZ are selectively turned on and turned off (the microdroplets Fb are selectively ejected). The control section 51 synchronizes the bit map data BMD with the clock signals generated by the oscillation circuit 56. The control section 51 thus transfers data for each scanning cycle (a single proceeding or retreating cycle of the substrate stage 23) to an ejection head driver circuit 67, which will be described later, as ejection control data SI.

The control section 51 performs a development procedure different from the development procedure for the bit map data BMD on the film forming data Ia. The waveform data of the piezoelectric element drive signal COM1 is thus generated in correspondence with film forming conditions. The waveform data is then provided to the drive signal generation circuit 54 and stored in a non-illustrated waveform memory of the drive signal generation circuit 54. The drive signal generation circuit 54 then performs digital-analog conversion on the waveform data. The obtained analog waveform signal is amplified to generate the corresponding piezoelectric element drive signal COM1. The control section 51 then provides the piezoelectric element drive signals COM1 to the ejection head driver circuit 67, which will be explained later, synchronously with the clock signals generated by the oscillation circuit 56.

With reference to FIG. 12, an X-axis motor driver circuit 62 is connected to the controller 50. The controller 50 thus sends an X-axis motor control signal to the X-axis motor driver circuit 62. In response to the X-axis motor control signal of the controller 50, the X-axis motor driver circuit 62 rotates the X-axis motor MX, which reciprocates the carriage 39, selectively in a forward direction and a reverse direction. For example, if the X-axis motor MX rotates in the forward direction, the carriage 39 moves in direction X. If the X-axis motor MX rotates in the reverse direction, the carriage 39 moves in the direction opposite to direction X.

A Y-axis motor driver circuit 63 is connected to the controller 50. The controller 50 thus sends a Y-axis motor control signal to the Y-axis motor driver circuit 63. In response to the Y-axis motor control signal of the controller 50, the Y-axis motor driver circuit 63 rotates the Y-axis motor MY, which reciprocates the substrate stage 33, selectively in a forward direction and a reverse direction. For example, if the Y-axis motor MY rotates in the forward direction, the substrate stage 33 moves in direction Y. If the Y-axis motor MY rotates in the reverse direction, the substrate stage 33 moves in the direction opposite to direction Y.

A substrate detector 64 is connected to the controller 50. The substrate detector 64 detects an end of the color filter substrate 10. Through such detection, the controller 50 computes the position of the color filter substrate 10 (the alignment film forming surface 25*a*) passing immediately below the carriage 39.

An X-axis motor rotation detector 65 is connected to the controller 50 and thus sends a detection signal to the controller 50. In correspondence with the detection signal of the X-axis motor rotation detector 65, the controller 50 detects the rotational direction and the rotational amount of the X-axis motor MX. The movement amount of the carriage 39 in direction X and the movement direction of the carriage 39 are thus computed.

A Y-axis motor rotation detector 66 is connected to the controller 50 and thus sends a detection signal to the controller 50. In correspondence with the detection signal of the Y-axis motor rotation detector 66, the controller 50 detects the rotational direction and the rotational amount of the Y-axis motor MY. The movement amount of the substrate stage 33 in direction Y and the movement direction of the substrate stage 33 are thus computed.

The ejection head driver circuit 67 is connected to the controller 50. The controller 50 sends the ejection control data SI and the piezoelectric element drive signal COM1 to the ejection head driver circuit 67. In correspondence with the ejection control data SI provided by the controller 50, the ejection head driver circuit 67 determines whether to provide the piezoelectric element drive signal COM1 to the corresponding piezoelectric element PZ.

A laser driver circuit 68 is connected to the controller 50 and the controller 50 sends a laser drive signal COM2 generated by the power supply circuit 55 to the laser driver circuit 68. In response to the laser drive signal COM2 sent from the controller 50, the laser driver circuit 68 actuates the semiconductor lasers LD to radiate the laser beams B.

A polygon motor driver circuit 69 is connected to the controller 50. In correspondence with a detection signal generated by the substrate detector 64, the controller 50 sends a polygon motor start signal SSP for starting the polygon motors MP to the polygon motor driver circuit 69. Specifically, the controller 50 provides the polygon motor start signal SSP to the polygon motor driver circuit 69 at a predetermined timing adjusted in such a manner that the rotational angle $\theta p$ of each polygon mirror 48 becomes zero degrees when the end of the alignment film forming surface 25*a* foremost in direction Y enters the scanning areas Ls. In response to the polygon motor start signal SSP of the controller 50, the polygon motor driver circuit 69 sends a polygon motor drive signal SPM to each polygon motor MP. In this manner, when the polygon motor driver circuit 69 receives the polygon motor start signals SSP from the controller 50, the polygon motor driver circuit 69 actuates the polygon motors MP so that the polygon mirrors 48 are rotated in a corresponding direction (direction R1 or direction R2).

Next, a method for forming the color filter substrate 10 (the alignment film 26) using the liquid droplet ejection apparatus 30 will be explained.

First, as illustrated in FIG. 4, the substrate 21 is placed on and fixed to the substrate stage 33 that is arranged at the proceed position. The end of the substrate 21 (the filter forming surface 21*a*) foremost in direction Y is located rearward from the guide member 36 in direction X.

In this state, the film forming data Ia is input to the input device 61, thus providing a manipulation signal for starting the alignment film forming program. The controller 50 thus operates the X-axis motor MX to cause the carriage to proceed from the proceed position. In this manner, the position of the carriage is set in such a manner that, when the substrate 21 moves in direction Y, the alignment film forming surface 25*a* passes immediately below the nozzles N. Further, the controller 50 actuates the Y-axis motor MY to transport the substrate stage 33 (the alignment film forming surface 25*a*) in direction Y at the transport speed Vy.

After the substrate detector 64 detects the end of the substrate 21 (the filter forming surface 21*a*) foremost in direction Y, the controller 50 computes whether the end of the alignment film forming surface 25*a* foremost in direction Y has reached a position immediately below the first head line LH1, in correspondence with a detection signal of the Y-axis motor rotation detector 66.

Meanwhile, also in correspondence with the detection signal of the Y-axis motor rotation detector 66, the controller 50 sends the polygon motor start signal SSP to the polygon motor driver circuit 69 at the predetermined timing. The polygon motors MP are thus actuated in such a manner that, when the end of the alignment film forming surface 25*a* foremost in direction Y reaches the scanning areas Ls, the rotational angle θp of each polygon mirror 48 becomes zero degrees. Also, the controller 50 provides the piezoelectric element drive signal COM1, which has been generated by the drive signal generation circuit 54, to the ejection head driver circuit 67 in accordance with the alignment film forming program. The controller 50 then stands by until the ejection control data SI based on the bit map data BMD, which is stored in the RAM 52, must be sent to the ejection head driver circuit 67 and the laser drive signal COM2, which is produced by the power supply circuit 55, must be provided to the laser driver circuit 68.

When the end of the alignment film forming surface 25*a* foremost in direction Y reaches the position immediately below the nozzles N of the first head line LH1, the controller 50 outputs the ejection control data SI to the ejection head driver circuit 67 in correspondence with the detection signal of the Y-axis motor rotation detector 66. In response to and in accordance with the ejection control data SI of the controller 50, the ejection head driver circuit 67 provides the piezoelectric element drive signal COM1 to the piezoelectric elements PZ of the first head line LH1. This causes all of the nozzles N of the first ejection heads FH1 to simultaneously eject the microdroplets Fb. The microdroplets Fb are then simultaneously received by the alignment film forming surface 25*a* and form the first droplets FD1. The controller 50 continuously operates to repeatedly eject the microdroplets Fb in accordance with the ejection control data SI, while moving the substrate stage 33 (the alignment film forming surface 25*a*) in direction Y. In this manner, the lower liquid film layers 26L1 are each formed by the first droplets FD1 that are connected together.

Subsequently, the end of the alignment film forming surface 25*a* foremost in direction Y reaches the position immediately below the nozzles N of the second head line LH2 after having been transported by the distance corresponding to the head width Wh from the position immediately below the nozzles N of the first head line LH1. Then, in accordance with the ejection control data SI, the ejection head driver circuit 67 provides the piezoelectric element drive signal COM1 to the piezoelectric elements PZ of the second head line LH2. This causes all of the nozzles N of the second ejection heads FH2 to simultaneously eject the microdroplets Fb. The microdroplets Fb are then simultaneously received by the alignment film forming surface 25*a* and form the second droplets FD2. The controller 50 continuously operates to repeatedly eject the microdroplets Fb in accordance with the ejection control data SI, while moving the substrate stage 33 (the alignment film forming surface 25*a*) in direction Y. In this manner, the upper liquid film layer 26L2 is formed by the second droplets FD2 that are connected together. This provides the liquid film 26L including the projected portions FDT and the recessed portions FDB, which extend in direction Y.

When the end of the alignment film forming surface 25*a* foremost in direction Y enters the scanning areas Ls, the controller 50 sends the laser drive signal COM2 to the laser driver circuit 68 in correspondence with the detection signal of the Y-axis motor rotation detector 66. In response to the laser drive signal COM2 of the controller 50, the laser driver circuit 68 provides the laser drive signal COM2 to the semiconductor lasers LD. The semiconductor lasers LD are thus operated to radiate the laser beams B. The laser beams B are then deflected and reflected by the corresponding polygon mirrors 48 arranged at the rotational angle θp of zero degrees. This forms the beam spots Bs, which extend in direction Y, at the scanning start positions Pe1 on the liquid film 26L. Through transportation of the alignment film forming surface 25*a* in direction Y and rotation of each polygon mirror 48 in direction R1 (direction R2), the beam spots Bs, which have been formed at the scanning start positions Pe1, are scanned in the following manner.

Specifically, each of the beam spots Bs is moved relatively to the liquid film 26L and in the synthetic direction of the facing direction of the upper liquid film layer 26L2 corresponding to the projected portion FDT with respect to the recessed portion FDB and the extending direction of the projected portion FDT (the recessed portion FDB). In this manner, scanning of the beam spot Bs is carried out until the beam spot Bs reaches the scanning end position Pe2. This evens the liquid film 26L (the projected portions FDT and the recessed portions FDB) in the scanning areas Ls. The thickness of the liquid film 26L thus becomes uniform.

The controller 50 continuously operates to repeatedly eject the microdroplets Fb from the first and second ejection heads FH1, FH2, while transporting the substrate stage 33 (the alignment film forming surface 25*a*) in direction Y. In this manner, the liquid film 26L is evened in the scanning areas Ls. This forms the liquid film 26L having the uniform thickness on the entire alignment film forming surface 25*a*.

After having formed the even liquid film 26L on the entire alignment film forming surface 25*a*, the controller 50 operates the Y-axis motor MY to return the substrate stage 33 (the substrate 21) to the proceed position. At the proceed position, the substrate 21 is separated from the substrate stage 33, and the liquid film 26L is subjected to a prescribed drying procedure (such as depressurization drying, heat drying, or laser radiation drying) and a prescribed alignment procedure. This provides the alignment film 26 that is uniformly aligned on the alignment film forming surface 25*a*.

The first embodiment, which is constructed as above-described, has the following advantages.

(1) In the first embodiment, the ends of each upper liquid film layer 26L2 is overlapped with the ends of the adjacent lower liquid film layers 26L1, which have been formed earlier than the upper liquid film layer 26L2. The overlapping areas of the lower liquid film layers 26L1 and the upper liquid film layers 26L2 are subjected to radiation of the laser beams B, which cause movement of the alignment film forming liquid F. The alignment film forming liquid F in each of the projected portions FDT is thus allowed to flow into the adjacent one of the recessed portions FDB. This increases evenness of the liquid film 26L and shaping accuracy of the alignment film 26.

(2) In the first embodiment, through rotation of the polygon mirrors 48, each beam spot Bs is scanned from the side corresponding to the projected portion FDT (the upper liquid film layer 26L2) to the side corresponding to the associated recessed portion FDB (the lower liquid film layer 26L1). The alignment film forming liquid F in the projected portion FDT is thus further effectively sent to the associated recessed portion FDB. This further improves the evenness of the liquid film 26L.

(3) In the first embodiment, by transporting the substrate stage 33 in direction Y, the alignment film forming surface

25*a* is scanned in the direction opposite to direction Y and relatively to the beam spots Bs. This reliably evens the projected portions FDT and the recessed portions EDB that are formed in the liquid film 26L along the entire width of the liquid film 26L in direction Y.

(4) In the first embodiment, the laser beams B are radiated immediately after the lower liquid film layers 26L1 and the upper liquid film layers 26L2 have been formed. This causes movement of the alignment film forming liquid F in the liquid film 26L before the lower and upper liquid film layers 26L1, 26L2 become dry. Accordingly, the evenness of the liquid film 26L is reliably increased.

(5) In the first embodiment, the radiation ports 45 radiate the laser beams B in direction Y with respect to the corresponding overlapping nozzles NE1, NE2. Each beam spot Bs is thus scanned on the corresponding projected portion FDT or recessed portion FDB. Therefore, using the multiple first and second ejection heads FH1, FH2, the evened liquid film 26L is formed over a relatively wide range.

A second embodiment of the present invention will now be described with reference to FIG. 13. The second embodiment includes a modification of the optical system using the laser beams B of the first embodiment. The following description thus focuses on the modification.

Figure 13:
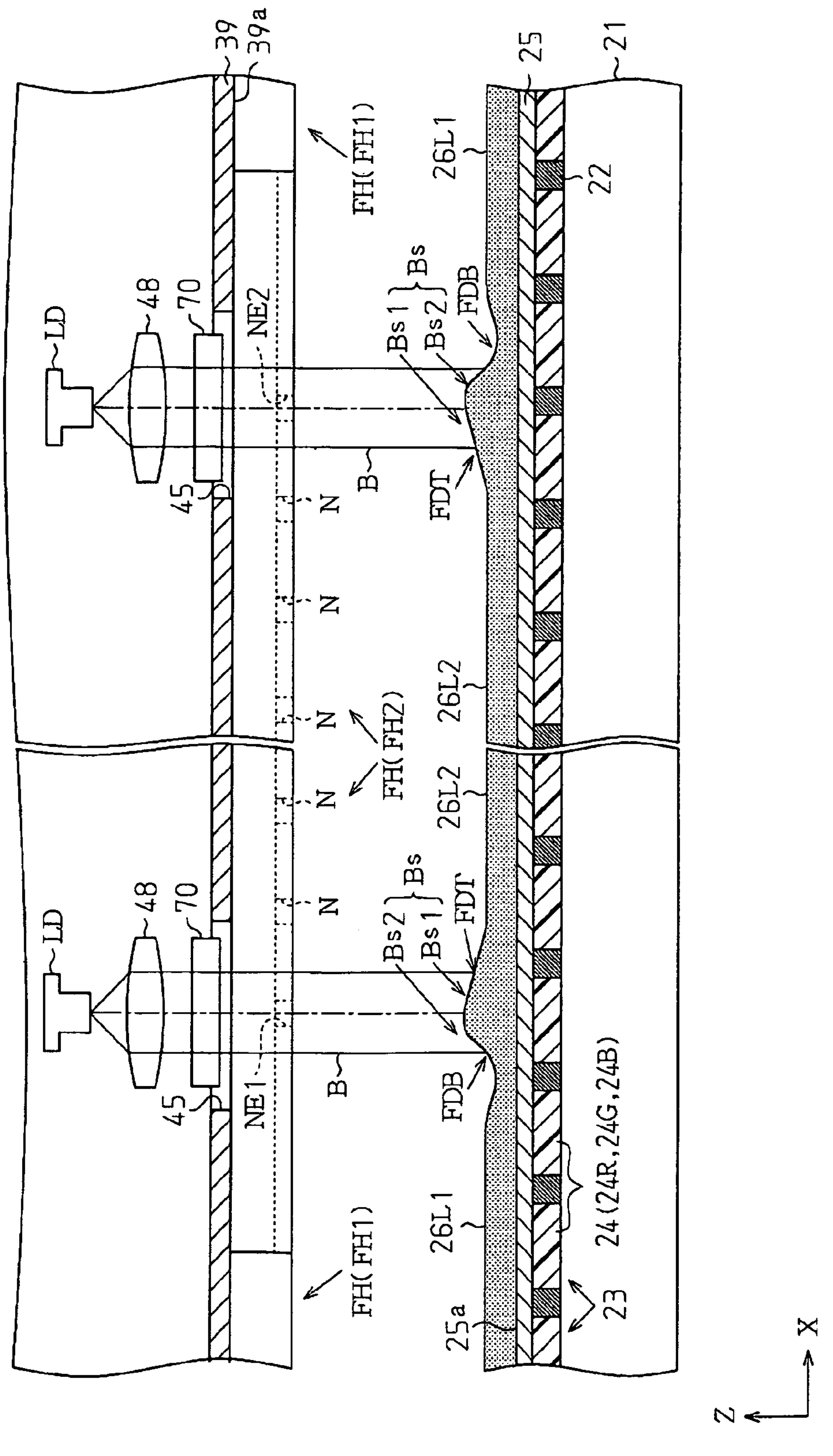
FIG. 13 is a cross-sectional view schematically showing a liquid droplet ejection head according to a second embodiment of the present invention.

As shown in FIG. 13, the collimator 46 of the first embodiment and a diffractive element 70 are arranged in correspondence with the radiation port 45 of each semiconductor laser LD. The semiconductor laser LD radiates coherent light in a wavelength range that evaporates the dispersion medium from the lower and upper liquid film layers 26L1, 26L2 or converts optical energy of the coherent light into translational movement of the molecules in the lower and upper liquid film layers 26L1, 26L2.

The center of each of the diffractive elements 70 in direction X is located at a position facing the top of the corresponding projected portion FDT. The diffractive elements 70 are mechanically or electrically actuated. In response to a diffractive element drive signal provided by the controller 50 of the first embodiment, each diffractive element 70 performs prescribed phase modulation on the laser beam B radiated by the associated semiconductor laser LD through the collimator 46. Specifically, in response to the laser drive signal COM2 and the diffractive element drive signal sent to each semiconductor laser LD and the associated diffractive element 70, respectively, the semiconductor laser LD radiates the laser beam B and the laser beam B is subjected to the phase modulation by the diffractive element 70. This forms a beam spot Bs having predetermined intensity distribution on the corresponding projected portion FDT.

More specifically, each of the beam spots Bs includes a first beam spot Bs1 and a second beam spot Bs2. The first beam spot Bs1 extends from the top of each projected portion FDT to the side corresponding to the associated upper liquid film layer 26L2. The second beam spot Bs2 extends from the top of the projected portion FDT to the side corresponding to the adjacent lower liquid film layer 26L1. Each of the first and second beam spots Bs1, Bs2 is formed in accordance with the intensity distribution corresponding to the thickness of the liquid film 26L, onto which the beam spot Bs1, Bs2 is radiated.

In other words, the radiation intensity of each of the first and second beam spots Bs1, Bs2 is the greatest at the top of the projected portion FDT and becomes gradually smaller toward the lower or upper liquid film layer 26L1, 26L2. The average radiation intensity of each first beam spot Bs1 is greater than the average radiation intensity of each second beam spot Bs2.

When the alignment film forming surface 25*a* (the liquid film 26L) having the projected portions FDT and the recessed portions FDB enters the beam spots Bs, the laser beam B having the greatest radiation intensity is radiated onto the vicinity of each projected portion FDT. The side of this top corresponding to the upper liquid film layer 26L2 receives the laser beam B having the radiation intensity greater than that of the laser beam B received by the side of the top corresponding to the opposing lower liquid film layer 26L1. In this state, in the vicinity of the top of each projected portion FDT onto which the laser beam B is radiated, the alignment film forming liquid F receives counteraction of evaporation of the dispersion medium or reactive force acting in the incident direction of the laser beam B. This moves the alignment film forming liquid F toward the lower liquid film layer 26L1, or the recessed portion FDB, at which the radiation intensity is smaller. The liquid film 26L is (the projected portions FDT and the recessed portions FDB are) thus evened at positions corresponding to the beam spots Bs, providing the liquid film 26L having uniform thickness on the entire alignment film forming surface 25*a*.

The second embodiment, which is constructed as above-described, has the following advantages.

(1) In the second embodiment, each diffractive element 70 modulates the phase of the laser beam B radiated by the associated semiconductor laser LD. In this manner, the beam spot Bs having the radiation an intensity in correspondence with the thickness of the liquid film 26L in the vicinity of each projected portion FDT. The laser beam B having the greatest radiation intensity is thus radiated onto the top of each projected portion FDT. The side of the top corresponding to the upper liquid film layer 26L2 receives the laser beam B having the radiation intensity greater than that of the laser beam B radiated onto the opposing lower liquid film layer 26L1.

Accordingly, simply by scanning the beam spots Bs in direction Y relatively to the alignment film forming surface 25*a*, the liquid film 26L having the uniform thickness can be provided. The evenness of the liquid film 26L and the shaping accuracy of the alignment film 26 are thus improved through simplified configuration.

(2) In the second embodiment, the laser beam B radiated by each semiconductor laser LD is the coherent light. The intensity distributions of the first and second beam spots Bs1, Bs2 are thus more accurately adjusted. This further reliably increases the evenness of the liquid film 26L and the shaping accuracy of the alignment film 26.

The illustrated embodiments may be modified as follows.

Figure 14:
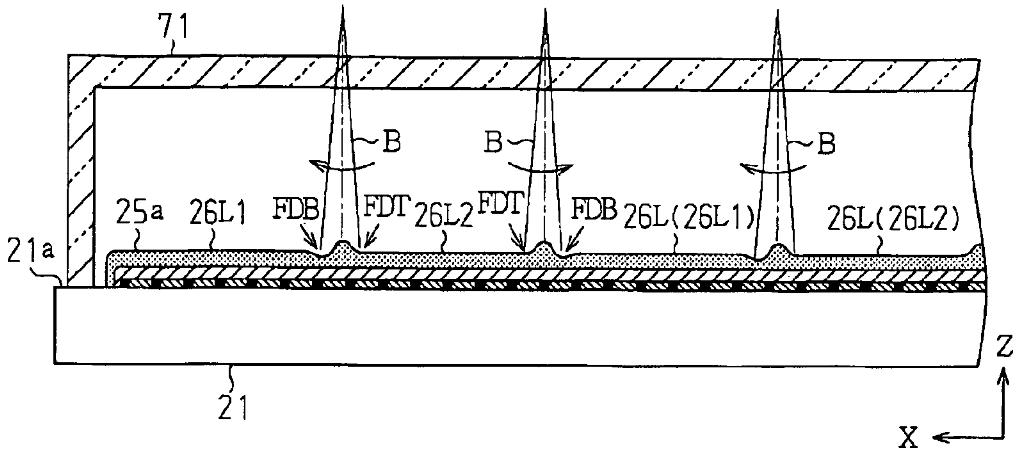
FIG. 14 is a view for explaining a liquid droplet ejection apparatus according to another embodiment of the present invention.

In the illustrated embodiments, the laser beams B are radiated directly onto the liquid film 26L. However, referring to FIG. 14, a cover 71 through which the laser beams B transit may be provided on the liquid film 26L for suppressing evaporation of the alignment film forming liquid F. The beam spots Bs are scanned through the cover 71. In this case, by suppressing the evaporation of the alignment film forming liquid F, flowability of the alignment film forming liquid F is maintained. This facilitates evening of the liquid film 26L and improves the shaping accuracy (uniformity) of the pattern (the alignment film 26).

In the illustrated embodiments, through ejection of the first and second droplets FD1, FD2, the projected portions FDT are formed in the boundaries between the lower liquid film layers 26L1 and the upper liquid film layers 26L2. However, through such ejection, only recesses defined by the liquid film having decreased thickness, for example, may be formed at the boundaries between the lower and upper liquid film layers 26L1, 26L2. Alternatively, empty spaces in which the liquid film is not provided may be provided in the boundaries between the lower and upper liquid film layers 26L1, 26L2. In either case, the laser beams B are radiated or scanned from areas in which the thickness of the liquid film 26L is greater to areas in which the thickness of the liquid film 26L is smaller. This evens the liquid film 26L.

In the illustrated embodiments, the liquid film 26L is evened through scanning of the beam spots Bs. However, through such scanning of the laser beams B, for example, the droplets in the scanning areas Ls (the projected portions FDT) may be moved to form recesses in which the film thickness is decreased in portions of the liquid film 26L corresponding to the scanning areas Ls.

In the illustrated embodiments, energy beams are embodied as the laser beams B. The laser beams B fall in the wavelength range that evaporates the alignment film forming liquid F or converts the optical energy of each laser beam B into the translational movement of the molecules forming the alignment film forming liquid F. Instead of this, any suitable energy beams (for example, coherent light, electron beams, ion beams, or plasma light) may be employed as long as the energy beams cause flow of the droplets received by the ejection target surface (the alignment film forming liquid F in the lower and upper liquid film layers 26L1, 26L2).

In the illustrated embodiments, the liquid film 26L is evened through radiation of the laser beams B. However, the liquid film 26L may be dried by radiating the laser beams B having increased radiation intensity after having been evened.

In the first embodiment, the scanning means that scans the laser beams B (the beam spots Bs) in direction X is defined by the polygon mirrors 48. However, the scanning means may be embodied as an optical system defined by, for example, a liquid crystal spatial light modulator or a diffractive element. That is, any suitable scanning means may be employed as long as the laser beams B are scanned from the overlapping areas to the non-overlapping areas.

Figure 15:
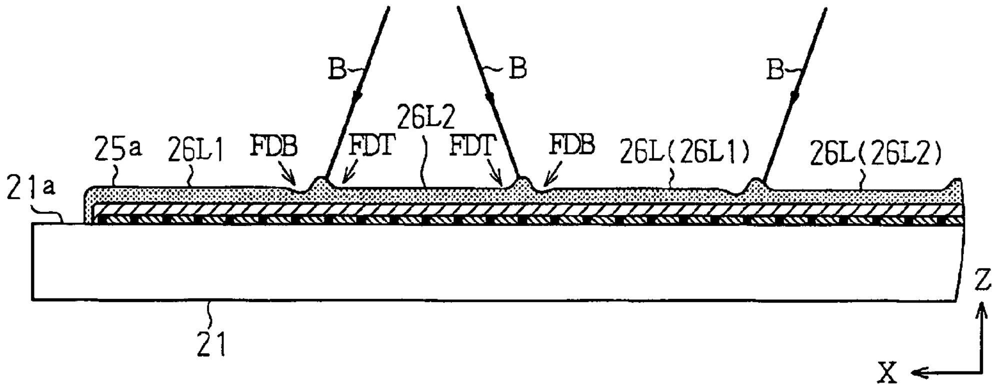
FIG. 15 is a view for explaining a liquid droplet ejection apparatus according to another embodiment of the present invention.

Further, with reference to FIG. 15, laser beams B each having a direction element heading from the corresponding projected portion FDT (the overlapping area) to the associated recessed portion FDB (the non-overlapping area) may be employed. In this case, the laser beams B are simply radiated from the sides corresponding to the projected portions FDT (the overlapping areas) without employing the scanning means.

Figure 16:
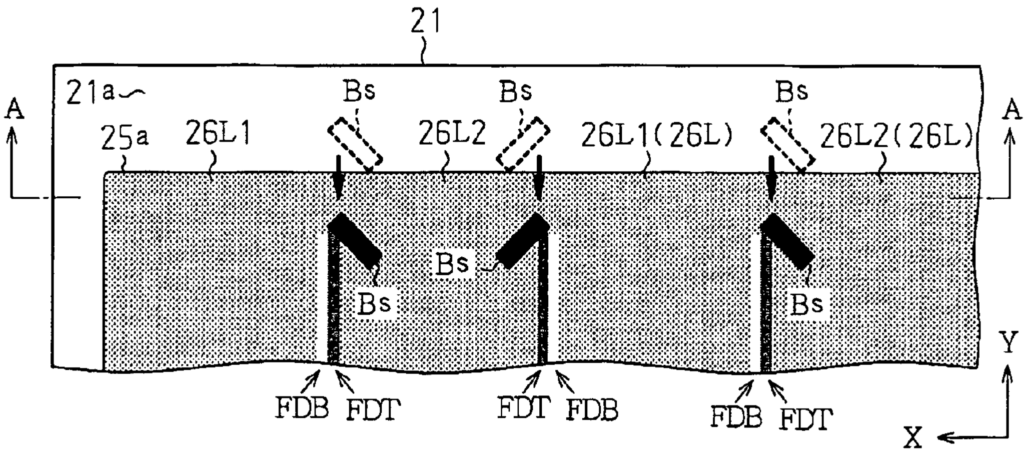
FIG. 16 is a view for explaining a liquid droplet ejection apparatus according to another embodiment of the present invention.
Figure 17A:
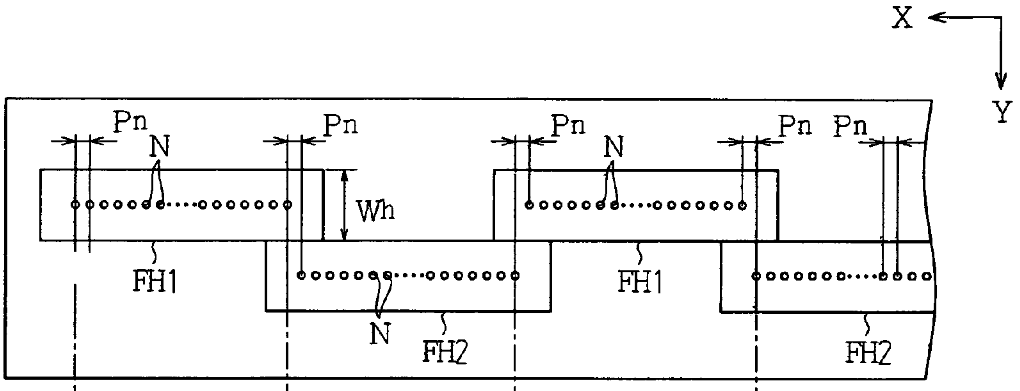
Fig. 17A(Prior Art)
FIGS. 17A and 17B are views for explaining positions of liquid droplet ejection heads of a typical liquid droplet ejection apparatus and droplets received by a substrate.
Figure 17B:
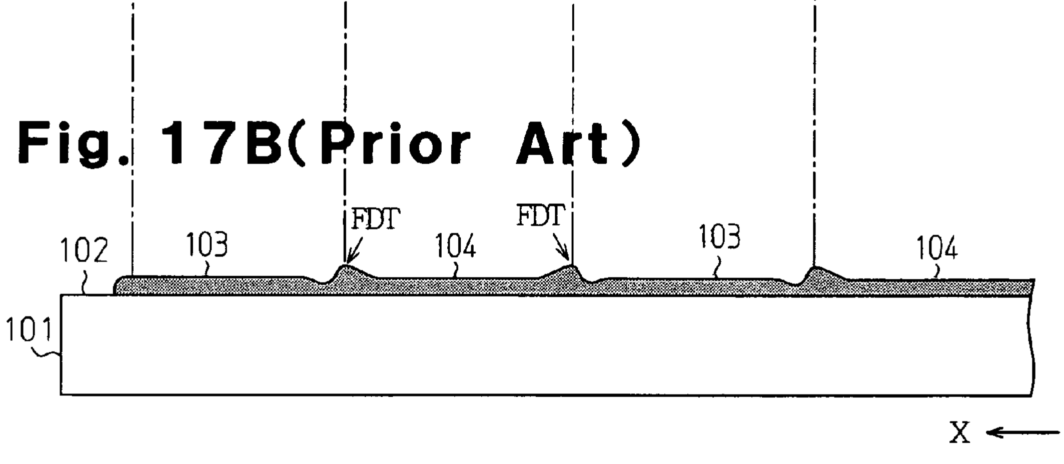
Fig. 17B(Prior Art)

Alternatively, referring to FIG. 16, without providing the scanning means, elongated beam spots Bs extending from the projected portions FDT to the corresponding upper liquid film layers 26L2 in a direction opposite to direction Y may be provided. In this case, the liquid film 26L is evened through transportation of the alignment film forming surface 25*a* (the substrate stage 33) in direction Y, or relative scanning of the elongated beam spots Bs.

This increases the evenness of the liquid film 26L and the shaping accuracy of the alignment film 26 through further simplified configuration.

In the illustrated embodiments, the substrate stage 33 defines the scanning means that scans the laser beams B in direction Y. The laser beams B are scanned along the corresponding projected portions FDT and relatively to the liquid film 26L. However, without providing the scanning means, for example, an elongated beam spot Bs extending along the entire width of the alignment film forming surface 25*a* in direction Y may be formed. In this case, a laser beam B is scanned along the entire width of the liquid film 26L in direction Y only for once.

In the illustrated embodiments, the pattern is defined by the alignment film 26 (the liquid film 26L). However, the alignment film forming liquid F may be changed to film forming liquid formed of different types of film forming material. In this case, the pattern may be embodied as a metal film of the opposing electrode 25 or an insulation film of the color layer 24, the overcoat layer, or the protective layer or different types of resist films.

In the illustrated embodiments, each of the beam spots Bs has an elongated shape extending in direction Y. However, the shape of the beam spot Bs may be, for example, a circular shape or a rectangular shape.

In the illustrated embodiments, the semiconductor lasers LD and the radiation ports 45 are defined in the carriage 39 of the liquid droplet ejection apparatus 30. However, the semiconductor lasers LD and the radiation ports 45 may be located at any suitable positions in the vicinities of the projected portions FDT of the liquid film 26L from which the laser beams B can be radiated. For example, a laser radiation device including the semiconductor lasers LD may be provided in addition to the liquid droplet ejection apparatus 30. In this case, the liquid film 26L is formed by the liquid droplet ejection apparatus 30 and transported to the laser radiation device, which evens the liquid film 26L.

Although the semiconductor lasers LD are employed as the energy beam radiation means in the illustrated embodiments, the energy beam radiation means may be defined by, for example, carbon dioxide gas lasers or YAG lasers. That is, any suitable energy beam radiation means may be used as long as the radiated laser beams fall in the wavelength range that causes the microdroplets Fb to flow and become dry.

In the illustrated embodiments, the electro-optic device is embodied as the liquid crystal display and the pattern of the alignment film 26 is embodied. However, for example, the electro-optic device may be embodied as an electroluminescence display. In this case, microdroplets Fb containing light emitting element forming material are ejected onto a light emitting element forming area to form the pattern of a light emitting element. This also improves shaping accuracy of the light emitting element and productivity of the electroluminescence display.

In the illustrated embodiments, the electro-optic device is embodied as the liquid crystal display and the pattern of the alignment film is embodied. However, the pattern of an insulating film of a display including a field effect type device (an FED or an SED) or the pattern of a metal wiring may be embodied. The field effect type device includes a flat electron release element and operates using light emission of a fluorescent substance caused by an electron emitted by the electron release element.

The invention claimed is:

1. A liquid droplet ejection apparatus comprising:

a liquid droplet ejecting portion that ejects droplets of liquid containing a pattern forming material onto an ejection target surface; and an energy beam radiating portion attached to the liquid droplet ejecting portion that radiates an energy beam onto a boundary between the droplets that have been received by the ejection target surface at different timings, thereby moving the liquid contained in boundary areas of the droplets, wherein, in the boundary between the droplets that have been received by the ejection target surface at the different timings, the boundary areas of the droplets overlap each other and thus form an overlapping area, and wherein the energy beam radiating portion includes a scanning mechanism, the scanning mechanism scanning the energy beam from the overlapping area toward a non-overlapping area, or non-boundary areas of the droplets so that the liquid contained in the overlapping area moves toward the non-overlapping area.

2. The liquid droplet ejection apparatus according to claim 1, wherein the energy beam radiated by the energy beam radiating portion has an intensity in correspondence with the thickness of the overlapping area.

3. The liquid droplet ejection apparatus according to claim 1, wherein the energy beam radiated by the energy beam radiating portion has a direction element extending from the overlapping area toward the non-overlapping area.

4. The liquid droplet ejection apparatus according to claim 1, wherein the liquid droplet ejecting portion includes a plurality of liquid droplet ejection heads, and wherein the overlapping area is formed by overlapping the boundary areas of droplets that have been ejected by different liquid droplet ejection heads with each other in the boundary between the droplets.

5. The liquid droplet ejection apparatus according to claim 1, wherein the energy beam radiated by the energy beam radiating portion is a light.

6. The liquid droplet ejection apparatus according to claim 5, wherein the energy beam radiated by the energy beam radiating portion is a coherent light.

7. The liquid droplet ejection apparatus according to claim 1, wherein the energy beam radiating portion includes a cover through which the energy beam transmits, the cover covering the droplets on the ejection target surface.

* * * * *